United States Patent
DiSalvo

(10) Patent No.: US 7,187,526 B2
(45) Date of Patent: Mar. 6, 2007

(54) CIRCUIT INTERRUPTING DEVICE WITH LOCK OUT AND REVERSIBLE WIRING

(75) Inventor: Nicholas L. DiSalvo, Levittown, NY (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 0 days.

(21) Appl. No.: 10/761,295

(22) Filed: Jan. 22, 2004

(65) Prior Publication Data

US 2005/0030685 A1 Feb. 10, 2005

Related U.S. Application Data

(60) Provisional application No. 60/444,549, filed on Feb. 3, 2003.

(51) Int. Cl.
*H02H 3/00* (2006.01)

(52) U.S. Cl. ........................................................ 361/42

(58) Field of Classification Search ................ 361/42, 361/47, 60, 63
See application file for complete search history.

(56) References Cited

U.S. PATENT DOCUMENTS

| | | | | |
|---|---|---|---|---|
| 3,668,471 | A * | 6/1972 | Ambler et al. ................. | 361/45 |
| 4,568,997 | A * | 2/1986 | Bienwald et al. .............. | 361/45 |
| 5,418,678 | A * | 5/1995 | McDonald ..................... | 361/46 |
| 5,541,800 | A | 7/1996 | Misencik | |
| 5,661,623 | A * | 8/1997 | McDonald et al. ............. | 361/42 |
| 5,706,155 | A * | 1/1998 | Neiger et al. .................. | 361/45 |
| 5,729,417 | A * | 3/1998 | Neiger et al. .................. | 361/45 |
| 6,052,265 | A * | 4/2000 | Zaretsky et al. ................ | 361/42 |
| 6,246,558 | B1 * | 6/2001 | DiSalvo et al. ................ | 361/42 |
| 6,437,700 | B1 * | 8/2002 | Herzfeld et al. ............. | 340/650 |
| 6,522,510 | B1 * | 2/2003 | Finlay et al. ................... | 361/42 |
| 6,621,388 | B1 * | 9/2003 | Macbeth ........................ | 335/18 |
| 6,693,779 | B2 * | 2/2004 | DiSalvo ......................... | 361/42 |
| 6,724,590 | B1 * | 4/2004 | Radosavljevic et al. ....... | 361/42 |
| 6,771,152 | B2 * | 8/2004 | Germain et al. ............... | 335/18 |
| 6,807,035 | B1 * | 10/2004 | Baldwin et al. ............... | 361/42 |
| 6,807,036 | B2 * | 10/2004 | Baldwin ........................ | 361/42 |
| 6,920,025 | B2 * | 7/2005 | Nelson .......................... | 361/42 |

* cited by examiner

*Primary Examiner*—Stephen W. Jackson
(74) *Attorney, Agent, or Firm*—Paul J. Sutton

(57) ABSTRACT

A resettable circuit interrupting device such as a GFCI that is immune to the problem of reverse wiring and, therefore, has load-line terminals that can be interchangeably connected to either at least one load or to a power source. Regardless of how the load-line terminals are connected, the resettable circuit interrupting device operates properly and retains leakage current fault protection. The circuit interrupting device includes an interrupting portion disposed within the device configured to cause electrical discontinuity in either the phase and/or neutral conductive paths between the line side and the load side upon the occurrence of a leakage condition. A reset portion disposed at least partially within the device is configured to initially establish or, after the detection of a leakage current fault, reestablish electrical continuity between the load and the line. The device comprises two differential transformers, one to detect leakage current when the load is connected to the load terminals, and the second coupled to detect leakage current when the load is connected to the line terminals. Separate rectifiers coupled to the differential transformers operate to power a solenoid to disconnect the line from the load upon the detection of leakage current in the load path.

14 Claims, 21 Drawing Sheets

CIRCUIT INTERRUPTING DEVICE WITH LOCK OUT AND REVERSIBLE WIRING

CROSS-REFERENCE TO RELATED APPLICATIONS

This application claims priority pursuant to 35 U.S.C. 119(e) from U.S. Provisional Patent Application having application No. 60/444,549, filed Feb. 3, 2003.

BACKGROUND

1. Field of the Invention

The present application is directed to a family of resettable circuit interrupting devices and systems that includes ground fault circuit interrupters (GFCI's), arc fault circuit interrupters (AFCI's), immersion detection circuit interrupters (IDCI's), appliance leakage circuit interrupters (ALCI's), equipment leakage circuit interrupters (ELCI's), circuit breakers, contactors, latching relays and solenoid mechanisms. More particularly, the present application is directed to circuit interrupting devices that include a circuit interrupting portion that can break electrically conductive paths at both a line side and a load side of the devices.

2. Description of the Related Art

Many electrical wiring devices have a line side, which is connectable to an electrical power supply, and a load side, which is connectable to one or more loads and at least one conductive path between the line and load sides. Electrical connections to wires supplying electrical power or wires conducting electricity to the one or more loads are at line side and load side connections. The electrical wiring device industry has witnessed an increasing call for circuit breaking devices or systems which are designed to interrupt power to various loads, such as household appliances, consumer electrical products and branch circuits. In particular, electrical codes require electrical circuits in home bathrooms and kitchens to be equipped with ground fault circuit interrupters (GFCI), for example. Presently available GFCI devices, such as the device described in commonly owned U.S. Pat. No. 4,595,894, use an electrically activated trip mechanism to mechanically break an electrical connection between the line side and the load side. Such devices are resettable after they are tripped by, for example, the detection of a ground fault. In the device discussed in the '894 patent, the trip mechanism used to cause the mechanical breaking of the circuit (i.e., the conductive path between the line and load sides) includes a solenoid (or trip coil). A test button is used to test the trip mechanism and circuitry used to sense faults, and a reset button is used to reset the electrical connection between line and load sides.

However, instances may arise where an abnormal condition, caused by for example a lightning strike, occurs which may result not only in a surge of electricity at the device and a tripping of the device but also a disabling of the trip mechanism used to cause the mechanical breaking of the circuit. This may occur without the knowledge of the user. Under such circumstances an unknowing user, faced with a GFCI which has tripped, may press the reset button which, in turn, will cause the device with an inoperative trip mechanism to be reset without the ground fault protection available.

Further, an open neutral condition, which is defined in Underwriters Laboratories (UL) Standard PAG 943A, may exist with the electrical wires supplying electrical power to such GFCI devices. If an open neutral condition exists with the neutral wire on the line (versus load) side of the GFCI device, an instance may arise where a current path is created from the phase (or hot) wire supplying power to the GFCI device through the load side of the device and a person to ground. In the event that an open neutral condition exists, current GFCI devices, which have tripped, may be reset even though the open neutral condition may remain.

Commonly owned application Ser. No. 09/138,955, filed Aug. 24, 1998, which is incorporated herein in its entirety by reference, describes a family of resettable circuit interrupting devices capable of locking out the reset portion of the device if the circuit interrupting portion is non-operational or if an open neutral condition exists. Commonly owned application Ser. No. 09/175,228, filed Sep. 20, 1998, which is incorporated herein in its entirety by reference, describes a family of resettable circuit interrupting devices capable of locking out the reset portion of the device if the circuit interrupting portion is non-operational or if an open neutral condition exists and capable of breaking electrical conductive paths independent of the operation of the circuit interrupting portion.

Some of the circuit interrupting devices described above have a user accessible load side connection in addition to the line and load side connections. The user accessible load side connection includes one or more connection points where a user can externally connect to electrical power supplied from the line side. The load side connection and user accessible load side connection are typically electrically connected together. An example of such a circuit interrupting device is a GFCI receptacle, where the line and load side connections are binding screws and the user accessible load side connection is the plug connection (i.e., a three-prong or two-prong male plug). As noted, such devices are connected to external wiring so that line wires are connected to the line side connection and load side wires are connected to the load side connection. However, instances may occur where the circuit interrupting device is improperly connected to the external wires so that the load wires are connected to the line side connection and the line wires are connected to the load connection. This is known as reverse wiring. In the event the circuit interrupting device is reverse wired, fault protection to the user accessible load connection may be eliminated, even if fault protection to the load side connection remains. Further, because fault protection is eliminated the load terminals or user accessible plugs will have electrical power making a user think that the device is operating properly when in fact it is not. Therefore, there exists a need to detect faults when the circuit interrupting device is reverse wired. Also, there exists a need to prevent a device from being reverse wired.

SUMMARY

The present application relates to a family of resettable circuit interrupting devices each having at least two pairs of terminals for line side and load side connections and where each such device maintains fault protection regardless of which pair of terminals are connected to the load or the line connections. The resettable circuit interrupting devices of the present invention are thus immune to the problem of reverse wiring because the terminal pairs can be interchangeably connected to either one or more loads or to a power source. In a first wiring configuration, the first pair of terminals can be connected to the load and the second pair of terminals can be connected to the line (i.e., electrical power). Alternatively, in a second wiring configuration, the first pair can be connected to the line and the second pair can be connected to the load. The resettable circuit interrupting device of the present invention operates properly and maintains fault protection regardless of which wiring configuration is used.

In one embodiment, the circuit interrupting device includes a housing and phase and neutral conductive paths disposed at least partially within the housing between the first and second pairs of terminals. The phase conducting path ends at a phase terminal and the neutral conducting path ends at a neutral terminal. Preferably, one of the phase terminals (e.g., from the first pair of terminals) is connected to a source of electricity and the other phase terminal (e.g., from the second pair of terminals) is available for connection to one or more loads.

The circuit interrupting device also includes a circuit interrupting portion that is disposed within the housing and configured to cause electrical discontinuity in one or both of the phase and neutral conductive paths, between said line side and said load side upon the occurrence of a predetermined condition. A reset portion is disposed at least partially within the housing and is configured to reestablish electrical continuity in the open conductive paths.

Preferably, the phase conductive path includes a plurality of switch devices that are capable of opening to cause electrical discontinuity in the phase conductive path and closing to reestablish electrical continuity in the phase conductive path, between said line and load sides. The neutral conductive path also includes a plurality of switch devices that are capable of opening to cause electrical discontinuity in the neutral conductive path and closing to reestablish electrical continuity in the neutral conductive path between said line and load sides. In this configuration, the circuit interrupting portion causes the plurality of switch devices (with contacts) of the phase and neutral conductive paths to open, and the reset portion causes the plurality of switch devices (with contacts) of the phase and neutral conductive paths to close.

One embodiment for the circuit interrupting portion uses an electromechanical circuit interrupter to cause electrical discontinuity in the phase and neutral conductive paths, and sensing circuitry to sense the occurrence of the predetermined condition. For example, the electromechanical circuit interrupter includes a coil assembly, a movable plunger attached to the coil assembly and a banger attached to the plunger. The movable plunger is responsive to energizing of the coil assembly, and movement of the plunger is translated to movement of said banger. Movement of the banger causes the electrical discontinuity in the phase and/or neutral conductive paths.

The circuit interrupting device may also include a reset lockout portion that prevents the reestablishing of electrical continuity in either the phase or neutral conductive path or both conductive paths, unless the circuit interrupting portion is operating properly. That is, the reset lockout prevents resetting of the device unless the circuit interrupting portion is operating properly. In embodiments where the circuit interrupting device includes a reset lockout portion, the reset portion may be configured so that at least one reset contact is electrically connected to the sensing circuitry of the circuit interrupting portion, and that depression of a reset button causes at least a portion of the phase conductive path to contact at least one reset contact. When contact is made between the phase conductive path and the at least one reset contact, the circuit interrupting portion is activated so that the reset lockout portion is disabled and electrical continuity in the phase and neutral conductive paths can be reestablished.

The circuit interrupting device may also include a trip portion that operates independently of the circuit interrupting portion. The trip portion is disposed at least partially within the housing and is configured to cause electrical discontinuity in the phase and/or neutral conductive paths independent of the operation of the circuit interrupting portion. In one embodiment, the trip portion includes a trip actuator accessible from an exterior of the housing and a trip arm preferably within the housing and extending from the trip actuator. The trip arm is preferably configured to facilitate mechanical breaking of electrical continuity in the phase and/or neutral conductive paths, if the trip actuator is actuated. Preferably, the trip actuator is a button. However, other known actuators are also contemplated.

BRIEF DESCRIPTION OF THE DRAWINGS

Preferred embodiments of the present application are described herein with reference to the drawings in which similar elements are given similar reference characters, wherein.

DETAILED DESCRIPTION

Figure 1:
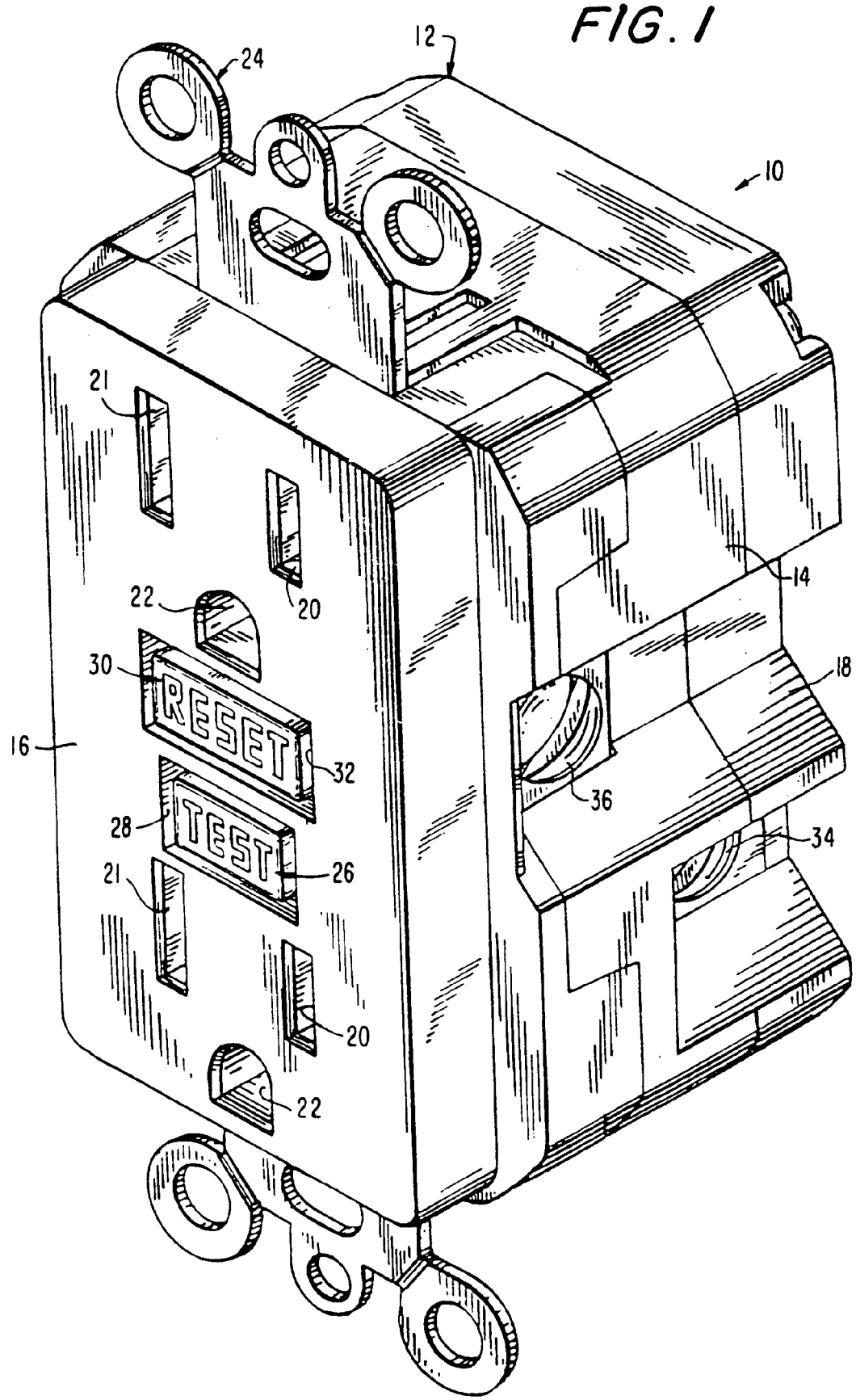
FIG. 1 is a perspective view of one embodiment of a ground fault circuit interrupting device according to the present application.

The present application contemplates various types of circuit interrupting devices that are capable of breaking at least one conductive path at a first side and a second side of the device. The first side can be connected to either a load or a source of electric power and the same can be said for the second side. In other words, the circuit interrupting devices of the present invention is capable of operating properly regardless to which terminals the source of electricity and the at least one load is connected. The at least two pairs of terminals are thus reversible because either terminal can accommodate either at least one load or a source of power. The conductive path is typically divided between a line side that connects to supplied electrical power and a load side that connects to one or more loads. As noted, the various devices in the family of resettable circuit interrupting devices include: ground fault circuit interrupters (GFCI's), arc fault circuit interrupters (AFCI's), immersion detection circuit interrupters (IDCI's), appliance leakage circuit interrupters (ALCI's) and equipment leakage circuit interrupters (ELCI's).

For the purpose of the present application, the structure or mechanisms used in the circuit interrupting devices, shown in the drawings and described hereinbelow, are incorporated into a GFCI device suitable for installation in a single-gang junction box used in, for example, a residential electrical wiring system. However, the mechanisms according to the present application can be included in any of the various devices in the family of resettable circuit interrupting devices.

The GFCI devices described herein have at least two pairs of terminals (one for the line connection and the other for at least one load connection). The at least one load connection permits external conductors or appliances to be connected to the device. These connections may be, for example, electrical fastening devices that secure or connect external conductors to the circuit interrupting device, as well as conduct electricity. Examples of such connections include binding screws, lugs, terminals and external plug connections.

In one embodiment, the GFCI device has a circuit interrupting portion, a reset portion and a reset lockout. This embodiment is shown in FIGS. 1–12. The configuration and electromechanical operation of the GFCI shown in FIGS. 1–12 operate in the manner described in U.S. Pat. No. 6,437,953 which is incorporated herein by reference. In another embodiment, the GFCI device is similar to the embodiment of FIGS. 1–12, except the reset lockout is omitted. Thus, in this embodiment, the GFCI device has a circuit interrupting portion and a reset portion, which is similar to those described in FIGS. 1–12. In another embodiment, the GFCI device has a circuit interrupting portion, a reset portion, a reset lockout and an independent trip portion. This embodiment is shown in FIGS. 13–20.

The circuit interrupting and reset portions described herein preferably use electro-mechanical components to break (open) and make (close) one or more conductive paths between the line and load sides of the device. However, electrical components, such as solid state switches and supporting circuitry, may be used to open and close the conductive paths.

Generally, the circuit interrupting portion is used to automatically break electrical continuity in one or more conductive paths (i.e., open the conductive path) between the line and load sides upon the detection of a fault, which in the embodiments described is a ground fault. The reset portion is used to close the open conductive paths.

In the embodiments including a reset lockout, the reset portion is used to disable the reset lockout, in addition to closing the open conductive paths. In this configuration, the operation of the reset and reset lockout portions is in conjunction with the operation of the circuit interrupting portion, so that electrical continuity in open conductive paths cannot be reset if the circuit interrupting portion is non-operational, if an open neutral condition exists.

In the embodiments including an independent trip portion, electrical continuity in one or more conductive paths can be broken independently of the operation of the circuit interrupting portion. Thus, in the event the circuit interrupting portion is not operating properly, the device can still be tripped.

The above-described features can be incorporated in any resettable circuit interrupting device, but for simplicity the descriptions herein are directed to GFCI devices.

Turning now to FIG. 1, the GFCI device 10 has a housing 12 consisting of a relatively central body 14 to which a face or cover portion 16 and a rear portion 18 are secured. The face portion 16 has entry ports 20 and 21 for receiving normal or polarized prongs of a male plug of the type normally found at the end of a lamp or appliance cord set (not shown), as well as ground-prong-receiving openings 22 to accommodate a three-wire plug. The GFCI device also includes a mounting strap 24 used to fasten the device to a junction box.

A test button 26 extends through opening 28 in the face portion 16 of the housing 12 is a mechanical trip. The circuit interrupting portion, to be described in more detail below, is used to break electrical continuity in one or more conductive paths between the line and load side of the device. A reset button 30 forming a part of the reset portion extends through opening 32 in the face portion 16 of the housing 12 causes a test and, if okay, then resets the device to be reestablished.

Electrical connections to existing household electrical wiring are made via binding screws 34 and 36 where, for example, screw 34 is an input (or line) phase connection, and screw 36 is an output (or load) phase connection. However, screw 34 can be an output phase connection and screw 34 an input phase or line connection. Screws 34 and 36 are one half of terminal pairs. Thus, two additional binding screws 38 and 40 (seen in FIG. 3) are located on the opposite side of the device 10. These additional binding screws provide line and load neutral connections, respectively. A more detailed description of a GFCI device is provided in U.S. Pat. No. 4,595,894, which is incorporated herein in its entirety by reference. It should also be noted that binding screws 34, 36, 38 and 40 are exemplary of the types of wiring terminals that can be used to provide the electrical connections. Examples of other types of wiring terminals include set screws, pressure clamps, pressure plates, push-in type connections, pigtails and quick-connect tabs.

Referring to FIGS. 2–6, the conductive path between the line phase connection 34 and the load phase connection 36 includes contact arm 50 which is movable between stressed and unstressed positions, movable contact 52 mounted to the contact arm 50, contact arm 54 secured to or monolithically formed into the load phase connection 36 and fixed contact 56 mounted to the contact arm 54. The user accessible load phase connection for this embodiment includes terminal assembly 58 having two binding terminals 60 which are capable of engaging a prong of a male plug inserted therebetween. The conductive path between the line phase connection 34 and the user accessible load phase connection includes, contact arm 50, movable contact 62 mounted to contact arm 50, contact arm 64 secured to or monolithically formed into terminal assembly 58, and fixed contact 66 mounted to contact arm 64. These conductive paths are collectively called the phase conductive path.

Similarly, the conductive path between the line neutral connection 38 and the load neutral connection 40 includes, contact arm 70 which is movable between stressed and unstressed positions, movable contact 72 mounted to contact arm 70, contact arm 74 secured to or monolithically formed into load neutral connection 40, and fixed contact 76 mounted to the contact arm 74. The user accessible load neutral connection for this embodiment includes terminal assembly 78 having two binding terminals 80 which are capable of engaging a prong of a male plug inserted therebetween. The conductive path between the line neutral connection 38 and the user accessible load neutral connection includes, contact arm 70, movable contact 82 mounted to the contact arm 70, contact arm 84 secured to or monolithically formed into terminal assembly 78, and fixed contact 86 mounted to contact arm 84. These conductive paths are collectively called the neutral conductive path.

Figure 2:
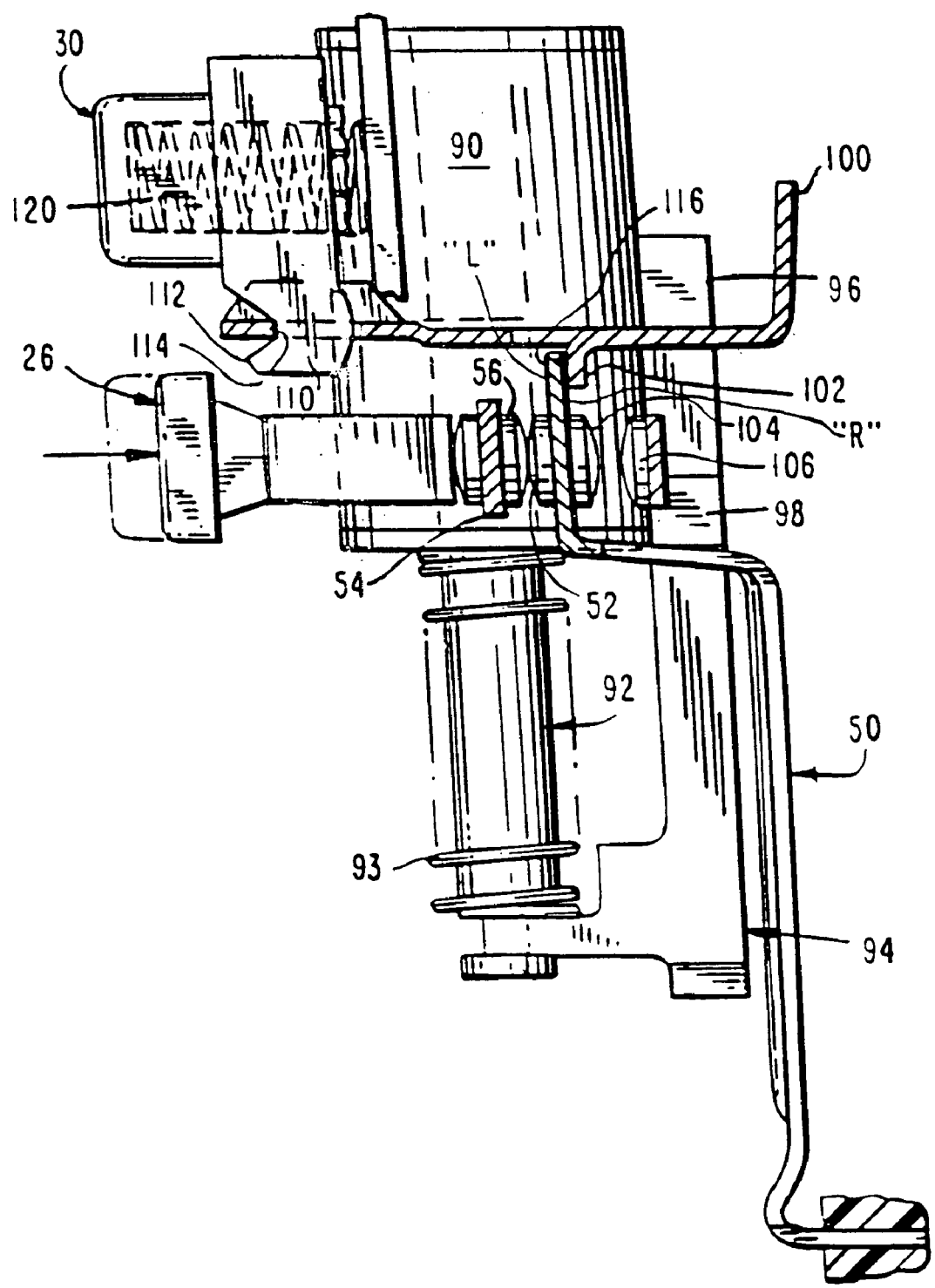
FIG. 2 is side elevational view, partly in section, of a portion of the GFCI device shown in FIG. 1, illustrating the GFCI device in a set or circuit making position.
Figure 3:
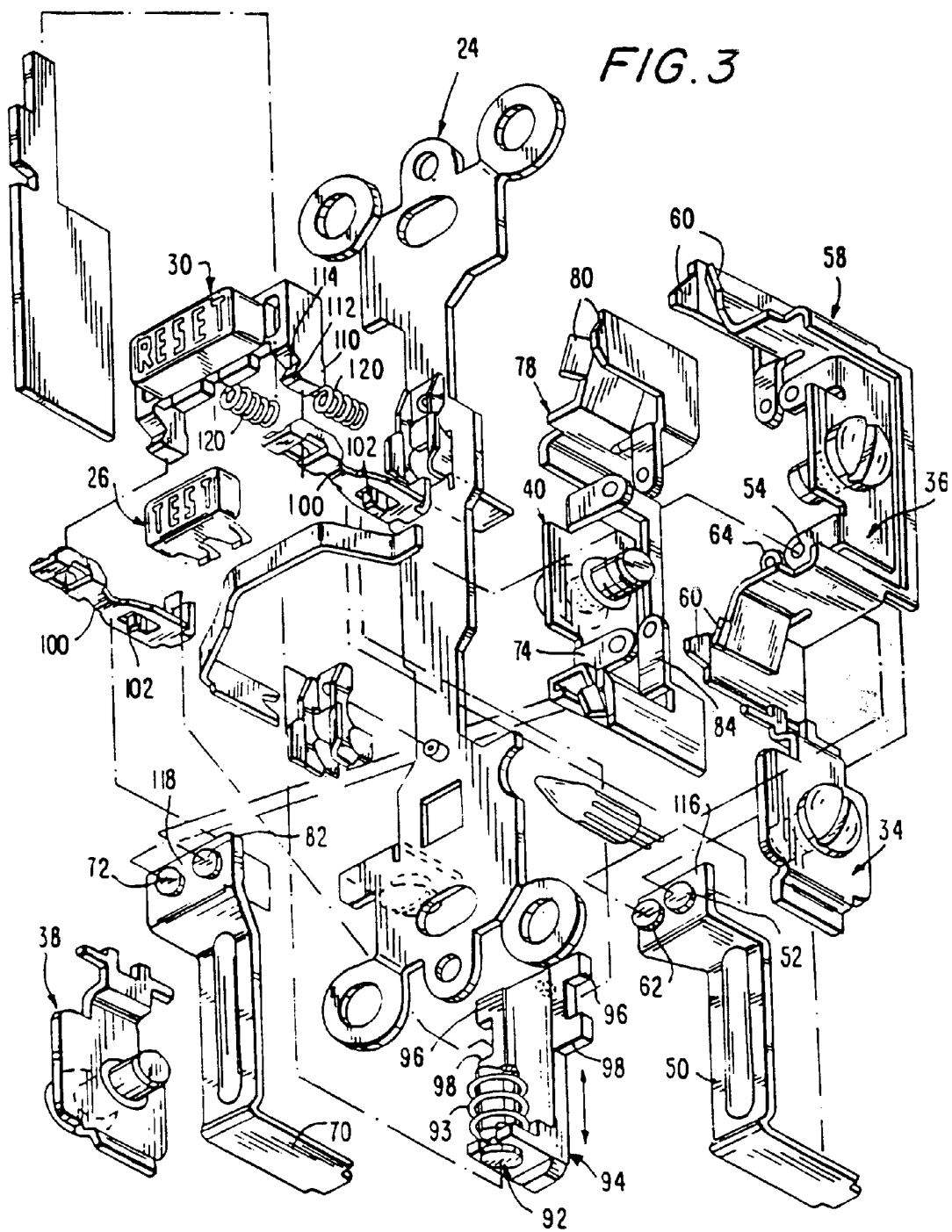
FIG. 3 is an exploded view of internal components of the circuit interrupting device of FIG. 1.

Referring to FIG. 2, the circuit interrupting portion has a circuit interrupter and electronic circuitry capable of sensing faults, e.g., current imbalances, on the hot and/or neutral conductors. In a preferred embodiment for the GFCI device, the circuit interrupter includes a coil assembly 90, a plunger 92 responsive to the energizing and de-energizing of the coil assembly and a banger 94 connected to the plunger 92. The banger 94 has a pair of banger dogs 96 and 98 which interact with a movable latching members 100 used to set and reset electrical continuity in one or more conductive paths. The coil assembly 90 is activated in response to the sensing of a ground fault by, for example, the sense circuitry shown in FIG. 12.

Figure 12:
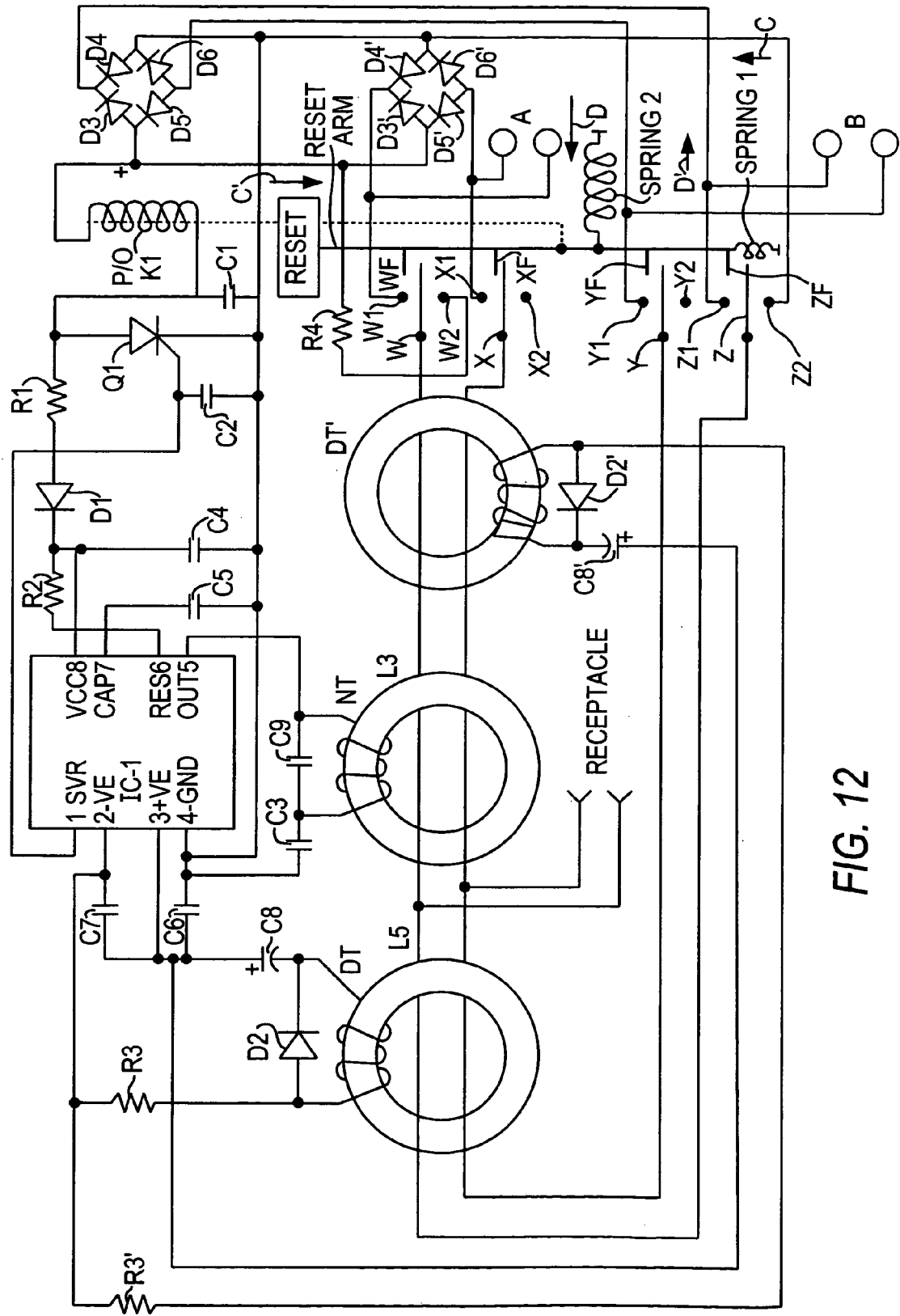
FIG. 12 is a schematic diagram of a circuit for detecting ground faults and a circuit that allows either pairs of terminals to be connected to either a load or a source of power.

Referring to FIG. 12, there is shown the detection circuit for the circuit interrupting device of the present invention. The detection circuit detects ground faults when either terminals A or terminals B are connected to a load or a source of electric power. The circuit interrupting device of FIG. 12 is configured such that either differential transformers DT or DT' can operate as transformers that detect leakage current from a load. Also, differential transformers DT and DT' are connected to full wave bridge rectifiers respectively. The RESET button has a reset arm (preferably made from an insulating or an electrically nonconductive material) having four levers (WF, XF, YF and ZF) which are positioned to engage latch wiper arms W, X, Y and Z respectively. The wiper arms are part of a mechanical latch where each wiper arm can take two positions, viz., wiper arm W can be electrically coupled to either contact W1 or W2; wiper arm X can be electrically coupled to either contact X1 or X2; wiper arm Y can be electrically coupled to either contact Y1 or Y2; wiper arm Z can be electrically coupled to either contact Z1 or Z2. In the configuration shown the latch having four wiper arms and two contacts for each arm is commonly referred to as a 4-pole double throw (4PDT) latch. The latch is spring biased to the left (direction shown by arrow D) with SPRING2 and upward (direction shown by arrow C) with SPRING 1. The RESET button being connected to the reset arm is therefore biased upwards as well. The wiper arms W, X, Y and Z are shown in an open position not electrically coupled to their corresponding contacts. When the RESET button is pressed (in the direction shown by arrow C') levers WF, XF, YF and ZF push down on their corresponding wiper arms W, X, Y and Z causing the wiper arms to make electrical connections to contacts W2, X2, Y2 and Z2 respectively. A circuit is therefore created with top rectifier (D3, D4, D5 and D6) and resistor R4 where a current flows through R4 from the positive point of the top rectifier to the negative point of the top rectifier. The current through R4 is detected by differential transformer DT' causing IC-1 to drive Q1 which shorts R1 and C1 to ground thereby activating relay K1 which causes electrically non-conductive reset arm to kick to the right (direction shown by arrow D') breaking the circuit comprising R4 and the top rectifier. SPRING 2 kicks the reset arm back in the direction shown by arrow D with the levers now positioned below their respective wiper arms because the reset button is still being pressed. When RESET button is released the levers push up the wiper arms (-in the direction shown by arrow C)—due to bias provided by SPRING 1—causing wiper arm W to electrically couple to contact W1, wiper arm X to electrically couple to contact X1, wiper arm Y to electrically couple to contact Y1 and wiper arm Z to electrically couple to contact Z1 thus connecting terminals A and B to the detection circuit. If a load is now connected to terminal B, any leakage current caused by that load will be detected by differential transformer DT and terminal A connected to the line will use bottom rectifier (D3', D4', D5' and D6') to provide power to IC-1 and supporting circuits of the detection circuitry. Alternatively, if a load is connected to terminal A, any leakage current caused by that load will be detected by differential transformer DT' and terminal B connected to the line will use top rectifier (D3, D4, D5 and D6) to provide power to IC-1 and supporting components of the detection circuitry. The receptacle (three hole or two hole female receptacle typically found in household outlets), which is a user accessible terminal, is connected to a load provided by a user and the leakage current from that load will be detected by the differential transformers and energize the relay as explained above. The supporting components comprise diodes D1, D2 and D2', resistors R1, R2, R3 and R3', capacitors C1–C7, C8 and C8' and C9. Q1 can be implemented as a transistor or and SCR (Silicon Controlled Rectifier). Although not shown an MOV (Metal Oxide Varistor) is typically coupled across C1 to protect the detection circuit from relatively large energy surges.

Referring back to FIG. 2, the reset portion includes reset button 30, the movable latching members 100 connected to the reset button 30, latching fingers 102 and reset contacts 104 and 106 that temporarily activate the circuit interrupting portion when the reset button is depressed, when in the tripped position. Preferably, the reset contacts 104 and 106 are normally open momentary contacts. The latching fingers 102 are used to engage side R of each contact arm 50,70 and move the arms 50,70 back to the stressed position where contacts 52,62 touch contacts 56,66, respectively, and where contacts 72,82 touch contacts 76,86, respectively.

The movable latching members 102 are, in this embodiment, common to each portion (i.e., the circuit interrupting, reset and reset lockout portions) and used to facilitate making, breaking or locking out of electrical continuity of one or more of the conductive paths. However, the circuit interrupting devices according to the present application also contemplate embodiments where there is no common mechanism or member between each portion or between certain portions. Further, the present application also contemplates using circuit interrupting devices that have circuit interrupting, reset and reset lockout portions to facilitate making, breaking or locking out of the electrical continuity of one or both of the phase or neutral conductive paths.

The natural bias of movable arms 50 and 70 is used as a passive inhibitor that prevents the contacts from touching.

Referring now to FIGS. 2 and 7–11, the mechanical components of the circuit interrupting and reset portions in various stages of operation are shown. For this part of the description, the operation will be described only for the phase conductive path, but the operation is similar for the neutral conductive path, if it is desired to open and close both conductive paths. In FIG. 2, the GFCI device is shown in a set position where movable contact arm 50 is in a stressed condition so that movable contact 52 is in electrical engagement with fixed contact 56 of contact arm 54. If the sensing circuitry of the GFCI device senses a ground fault, the coil assembly 90 is energized to draw plunger 92 into the coil assembly 90 so that banger 94 moves upwardly. As the banger moves upwardly, the banger front dog 98 strikes the latch member 100 causing it to pivot in a counterclockwise direction C (seen in FIG. 7) about the joint created by the top edge 112 and inner surface 114 of finger 110. The movement of the latch member 100 removes the latching finger 102 from engagement with side R of the remote end 116 of the movable contact arm 50, and permits the contact arm 50 to return to its pre-stressed condition opening contacts 52 and 56, seen in FIG. 7.

Figure 10:
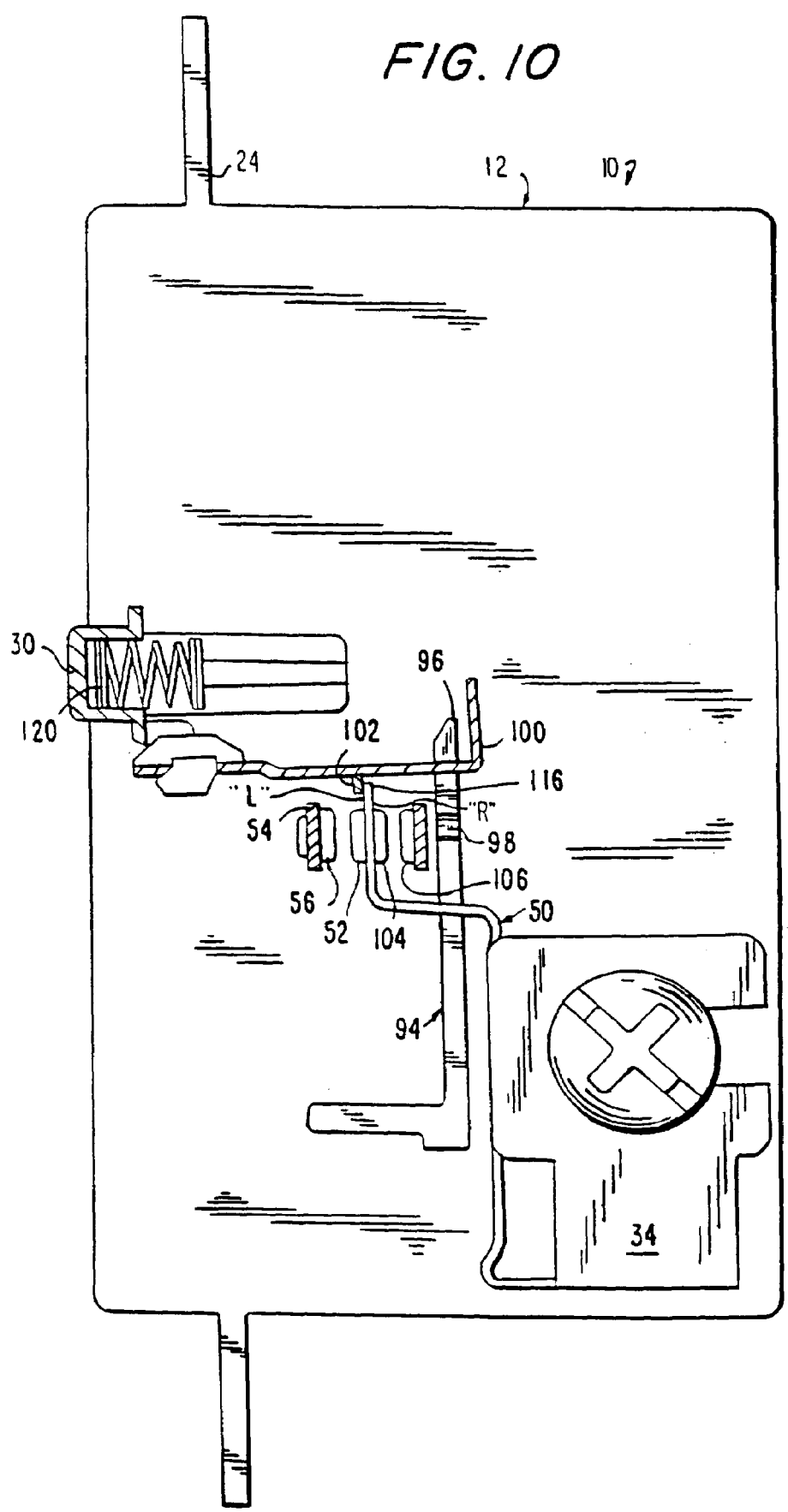

After tripping, the coil assembly 90 is de-energized so that spring 93 returns plunger 92 to its original extended position and banger 94 moves to its original position releasing latch member 100. At this time, the latch member 100 is in a lockout position where latch finger 102 inhibits movable contact 52 from engaging fixed contact 56, as seen in FIG. 10. The natural bias of movable arms 50 and 70 can be used as a passive inhibitor that prevents the contacts from touching.

Figure 7:
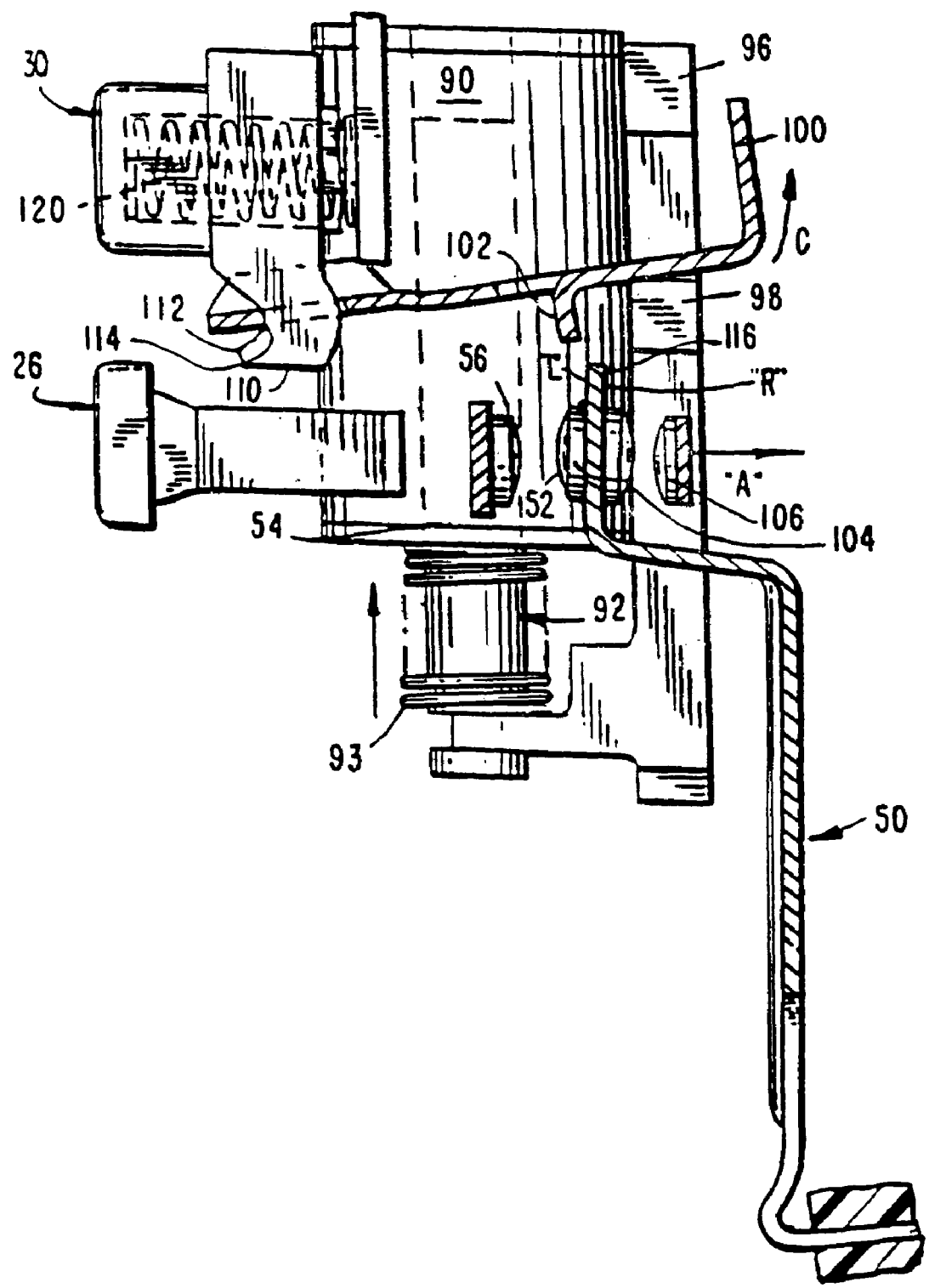
FIG. 7 is a side elevational view similar to FIG. 2, illustrating the GFCI device in a circuit breaking or interrupting position.
Figure 8:
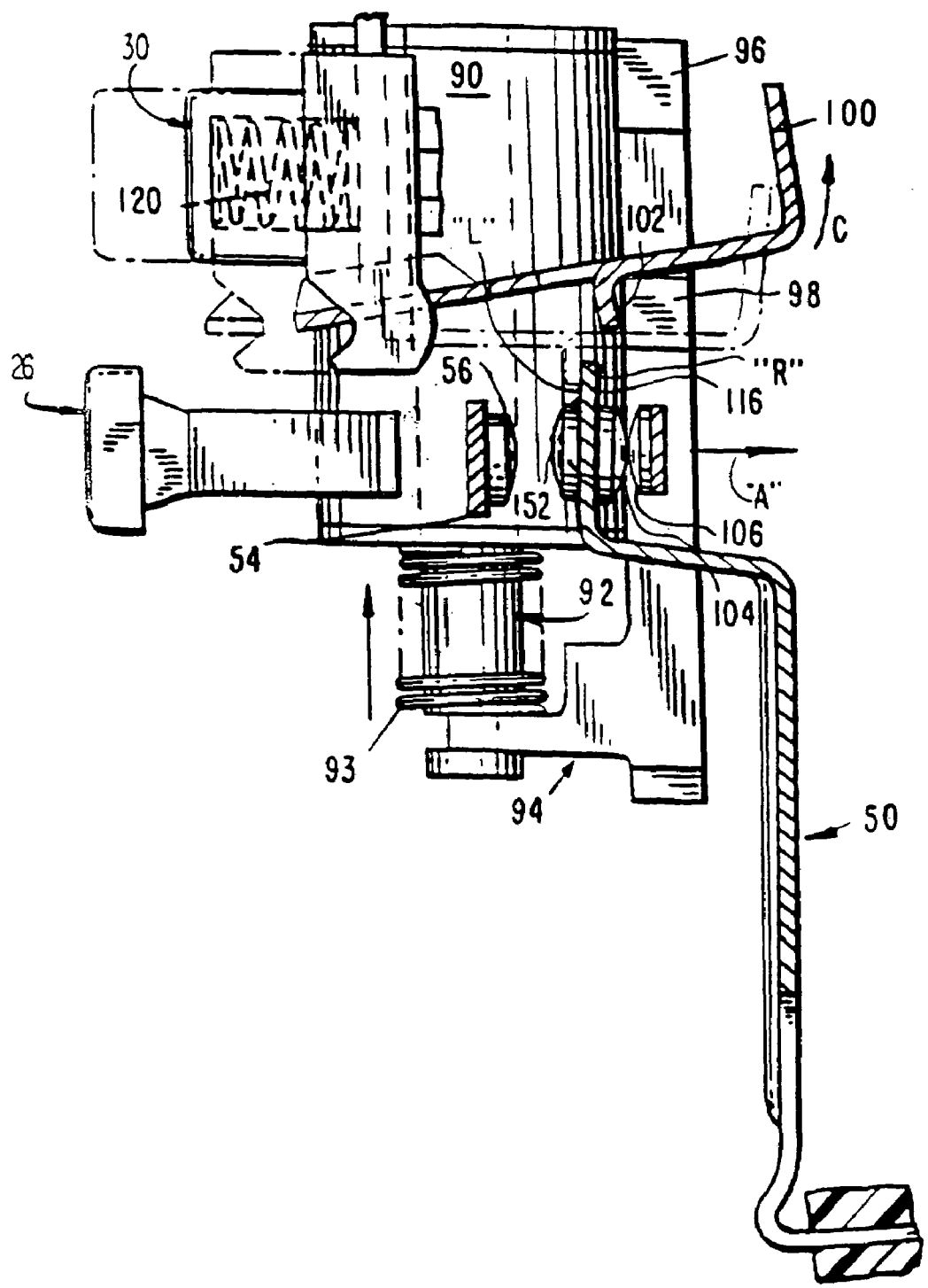
FIG. 8 is a side elevational view similar to FIG. 2, illustrating the components of the GFCI device during a reset operation.
Figure 11:
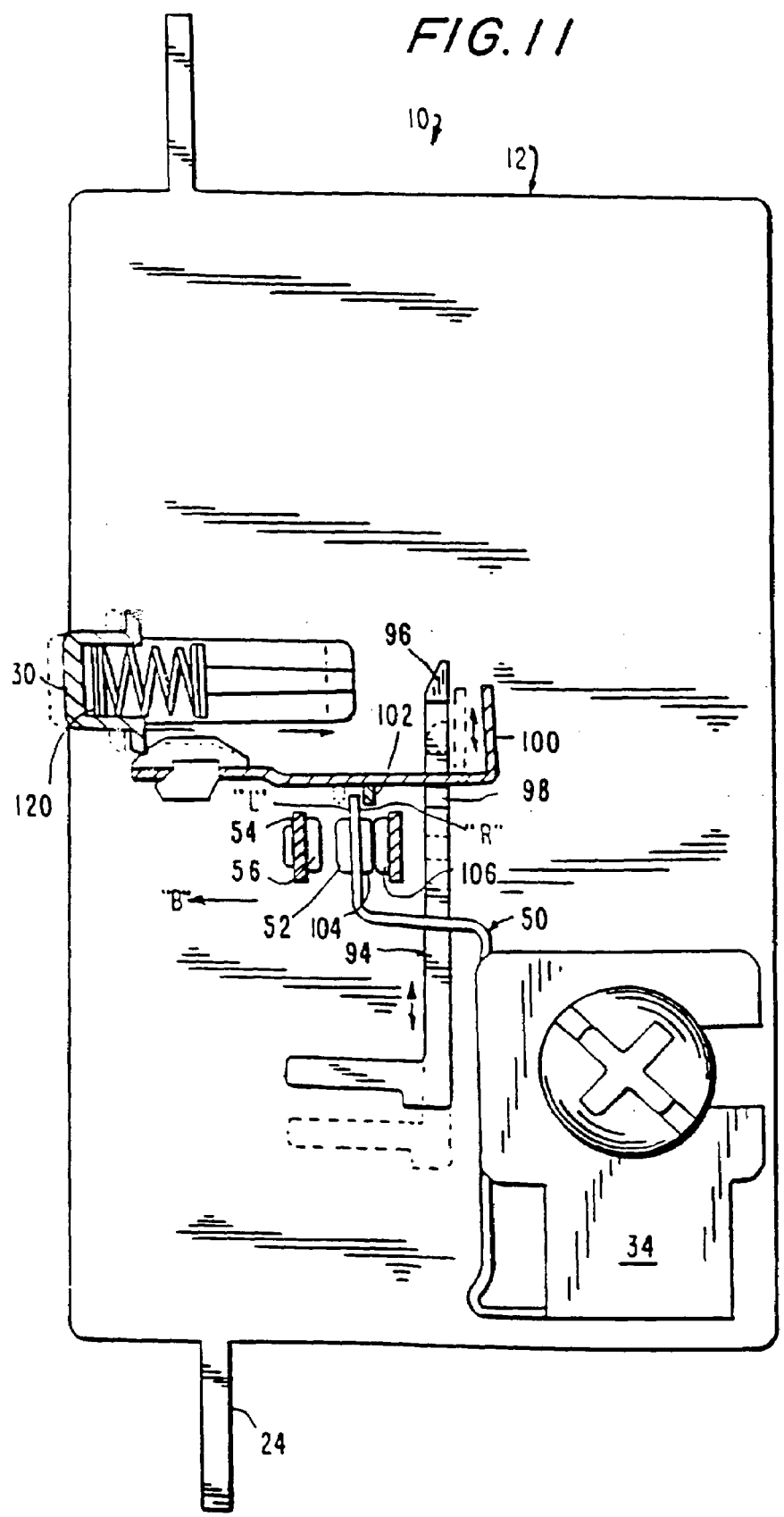

To reset the GFCI device so that contacts 52 and 56 are closed and continuity in the phase conductive path is reestablished, the reset button 30 is depressed sufficiently to overcome the bias force of return spring 120 and move the latch member 100 in the direction of arrow A, seen in FIG. 8. While the reset button 30 is being depressed, latch finger 102 contacts side L of the movable contact arm 50 and continued depression of the reset button 30 forces the latch member to overcome the stress force exerted by the arm 50 causing the reset contact 104 on the arm 50 to close on reset contact 106. Closing the reset contacts activates the operation of the circuit interrupter by, for example simulating a fault, so that plunger 92 moves the banger 94 upwardly striking the latch member 100 which pivots the latch finger 102, while the latch member 100 continues to move in the direction of arrow A. As a result, the latch finger 102 is lifted over side L of the remote end 116 of the movable contact arm 50 onto side R of the remote end of the movable contact arm, as seen in FIGS. 7 and 11. Contact arm 50 returns to its unstressed position, opening contacts 52 and 56 and contacts 62 and 66, so as to terminate the activation of the circuit interrupting portion, thereby de-energizing the coil assembly 90.

Figure 9:
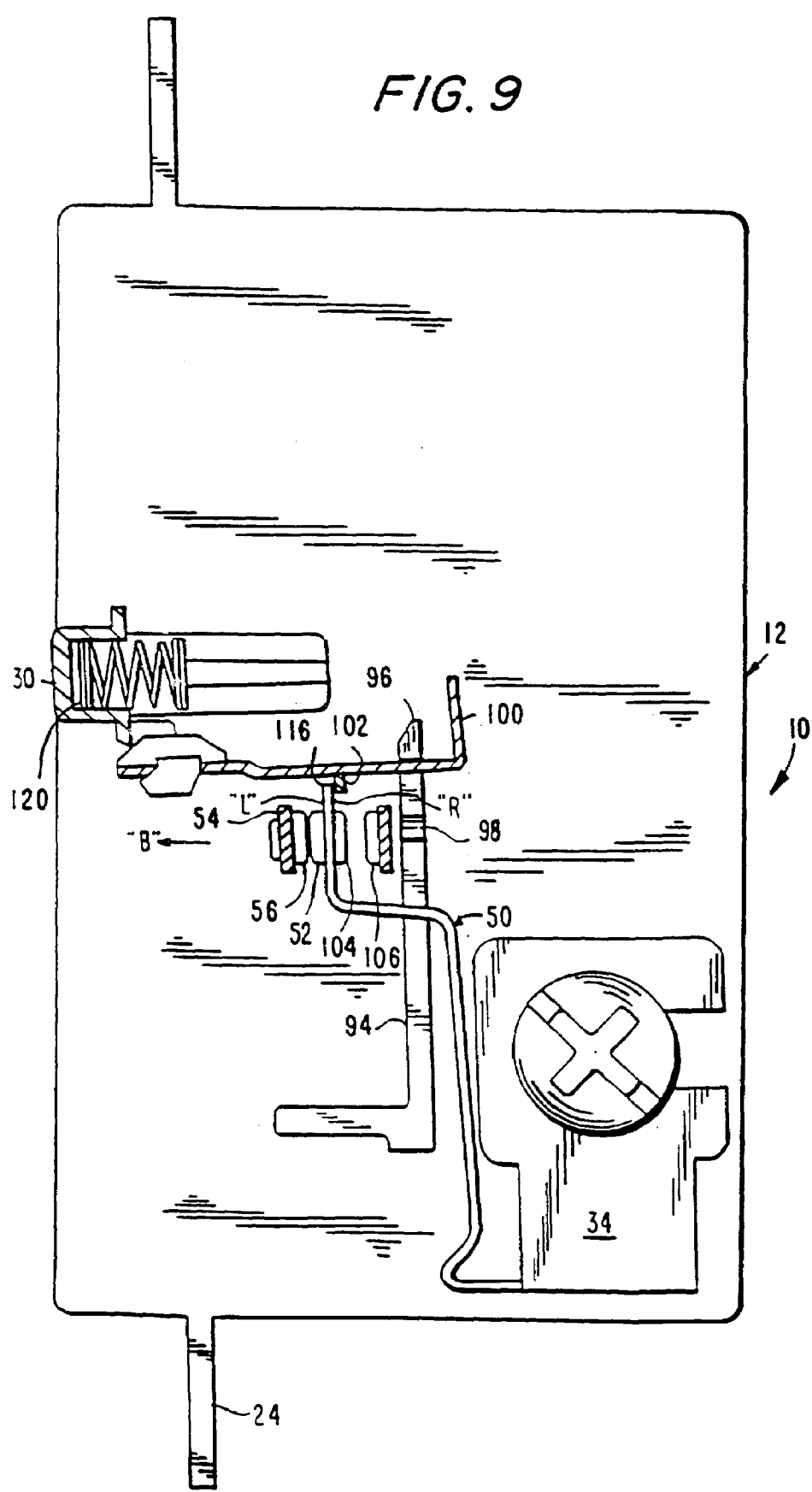
FIGS. 9–11 are schematic representations of the operation of one embodiment of the reset portion of the present application, illustrating a latching member used to make an electrical connection between line and load connections and to relate the reset portion of the electrical connection with the operation of the circuit interrupting portion.

After the circuit interrupter operation is activated, the coil assembly 90 is de-energized so that so that plunger 92 returns to its original extended position, and banger 94 releases the latch member 100 so that the latch finger 102 is in a reset position, seen din FIG. 9. Release of the reset button causes the latching member 100 and movable contact arm 50 to move in the direction of arrow B (seen in FIG. 9) until contact 52 electrically engages contact 56, as seen in FIG. 2.

As noted above, if opening and closing of electrical continuity in the neutral conductive path is desired, the above description for the phase conductive path is also applicable to the neutral conductive path.

In an alternative embodiment, the circuit interrupting devices may also include a trip portion that operates independently of the circuit interrupting portion so that in the event the circuit interrupting portion becomes non-operational the device can still be tripped. Preferably, the trip portion is manually activated and uses mechanical components to break one or more conductive paths. However, the trip portion may use electrical circuitry and/or electromechanical components to break either the phase or neutral conductive path or both paths.

For the purposes of the present application, the structure or mechanisms for this embodiment are also incorporated into a GFCI device, seen in FIGS. 13–20, suitable for installation in a single-gang junction box in a home. However, the mechanisms according to the present application can be included in any of the various devices in the family of resettable circuit interrupting devices.

Figure 13:
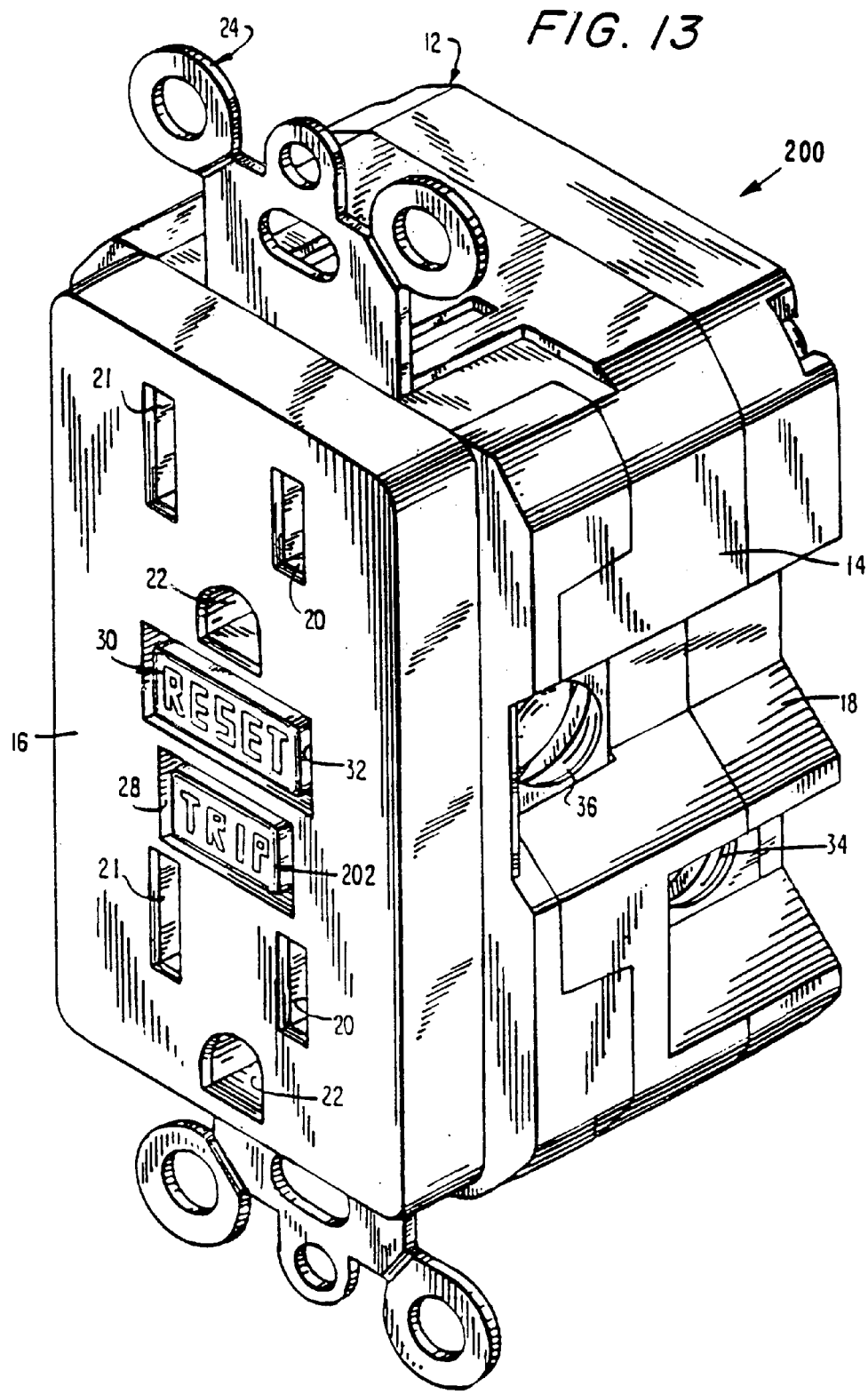
FIG. 13 is a perspective view of an alternative embodiment of a ground fault circuit interrupting device according to the present application.

Turning now to FIG. 13, the GFCI device 200 according to this embodiment is similar to the GFCI device described in FIGS. 1–12. Similar to FIG. 1, the GFCI device 200 has a housing 12 consisting of a relatively central body 14 to which a face or cover portion 16 and a rear portion 18 are, preferably, removably secured.

A trip actuator 202, preferably a button, which is part of the trip portion to be described in more detail below, extends through opening 28 in the face portion 16 of the housing 12. The trip actuator is used, in this exemplary embodiment, to mechanically trip the GFCI device, i.e., break electrical continuity in one or more of the conductive paths, independent of the operation of the circuit interrupting portion.

A reset actuator 30, preferably a button, which is part of the reset portion, extends through opening 32 in the face portion 16 of the housing 12. The reset button is used to activate the reset operation, which re-establishes electrical continuity in the open conductive paths, i.e., resets the device, if the circuit interrupting portion is operational.

As in the above embodiment, electrical connections to existing household electrical wiring are made via binding screws 34 and 36, where screw 34 is an input (or line) phase connection, and screw 36 is an output (or load) phase connection. It should be noted that two additional binding screws 38 and 40 (seen in FIG. 3) are located on the opposite side of the device 200. These additional binding screws provide line and load neutral connections, respectively. A more detailed description of a GFCI device is provided in U.S. Pat. No. 4,595,894, which is incorporated herein in its entirety by reference.

Referring to FIGS. 4–6, 14 and 17, the conductive paths in this embodiment are substantially the same as those described above. The conductive path between the line phase connection 34 and the load phase connection 36 includes, contact arm 50 which is movable between stressed and unstressed positions, movable contact 52 mounted to the contact arm 50, contact arm 54 secured to or monolithically formed into the load phase connection 36 and fixed contact 56 mounted to the contact arm 54 (seen in FIGS. 4, 5 and 17). The user accessible load phase connection for this embodiment includes terminal assembly 58 having two binding terminals 60 which are capable of engaging a prong of a male plug inserted therebetween. The conductive path between the line phase connection 34 and the user accessible load phase connection includes, contact arm 50, movable contact 62 mounted to contact arm 50, contact arm 64 secured to or monolithically formed into terminal assembly 58, and fixed contact 66 mounted to contact arm 64. These conductive paths are collectively called the phase conductive path.

Figure 4:
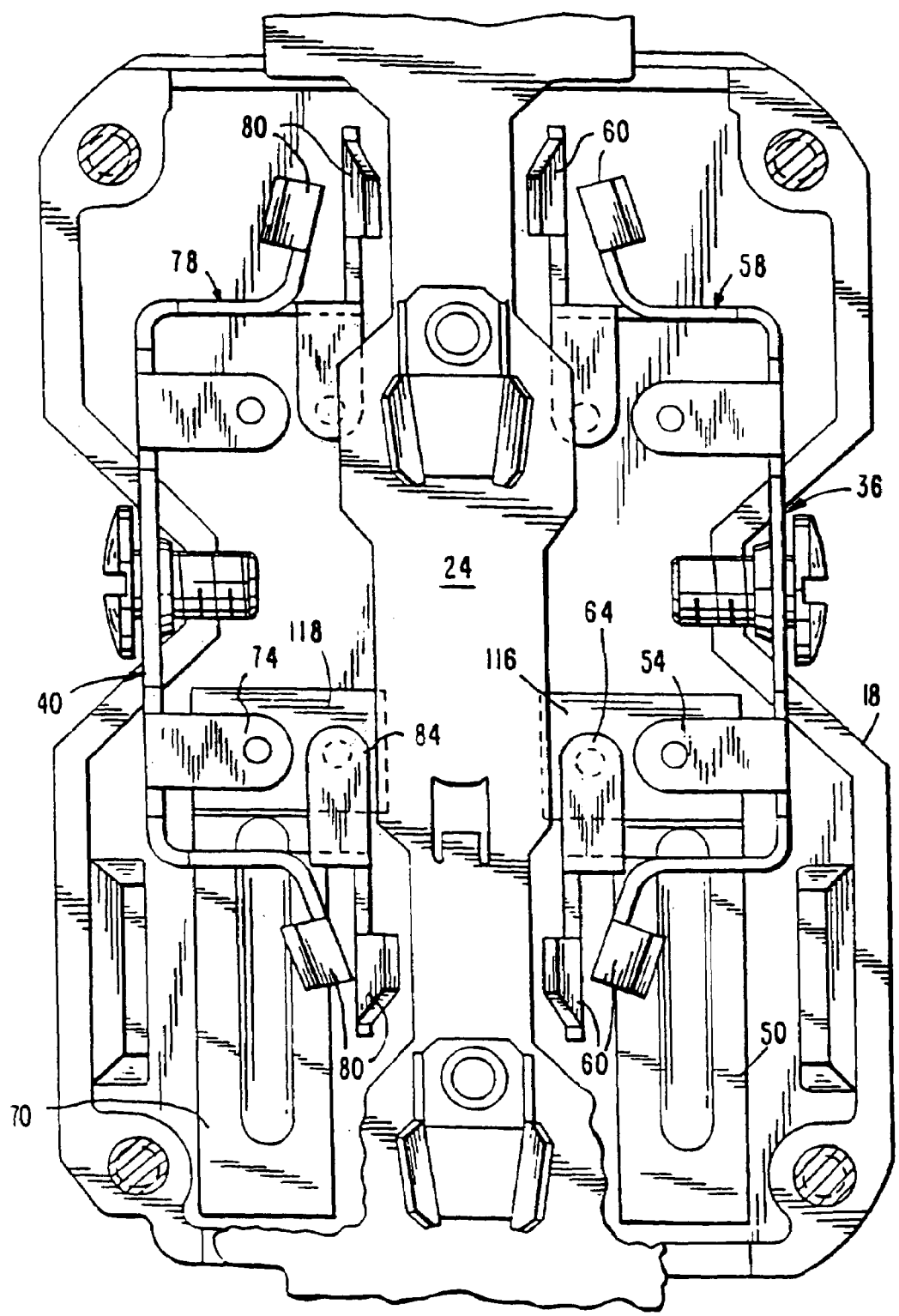
FIG. 4 is a plan view of portions of electrical conductive paths located within the GFCI device of FIG. 1.
Figure 5:
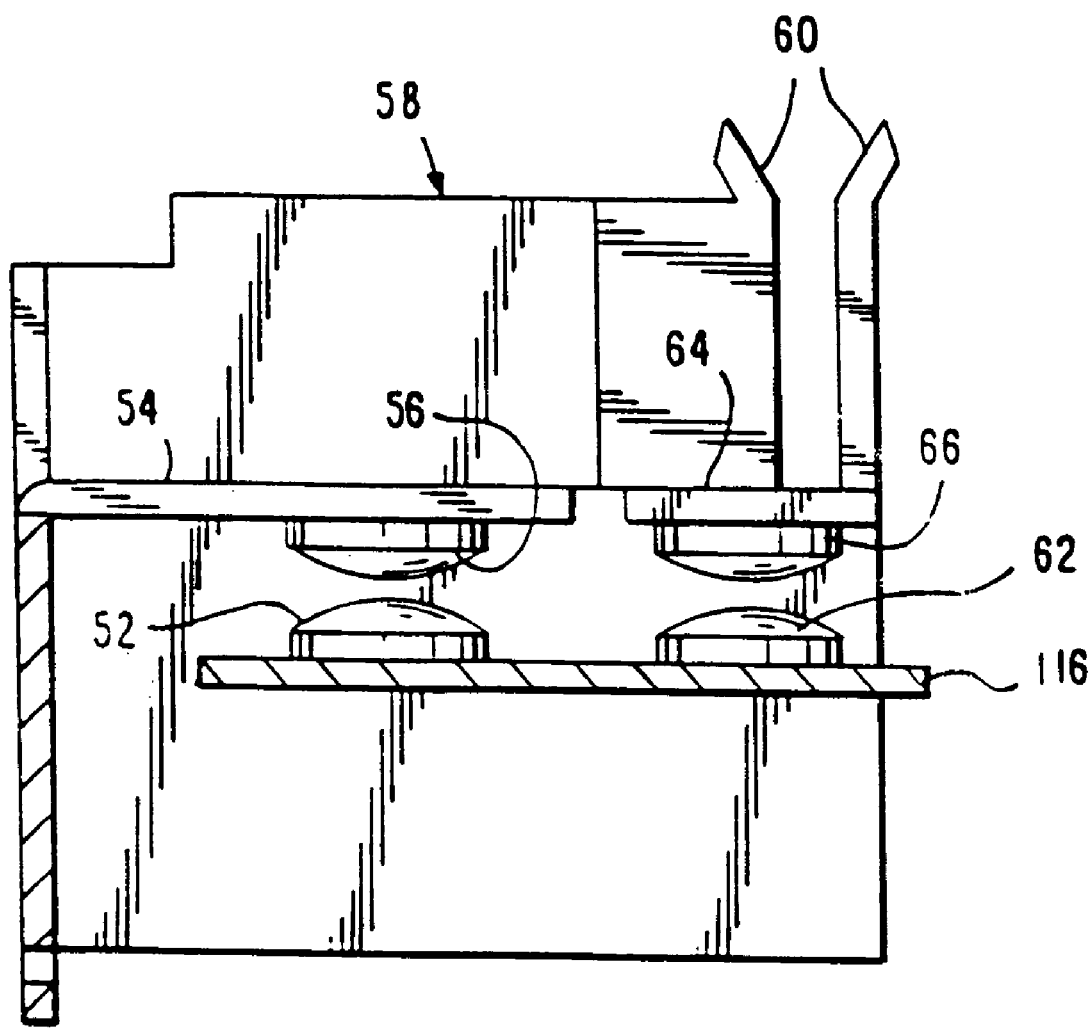
FIG. 5 is a partial sectional view of a portion of a conductive path shown in FIG. 4.
Figure 6:
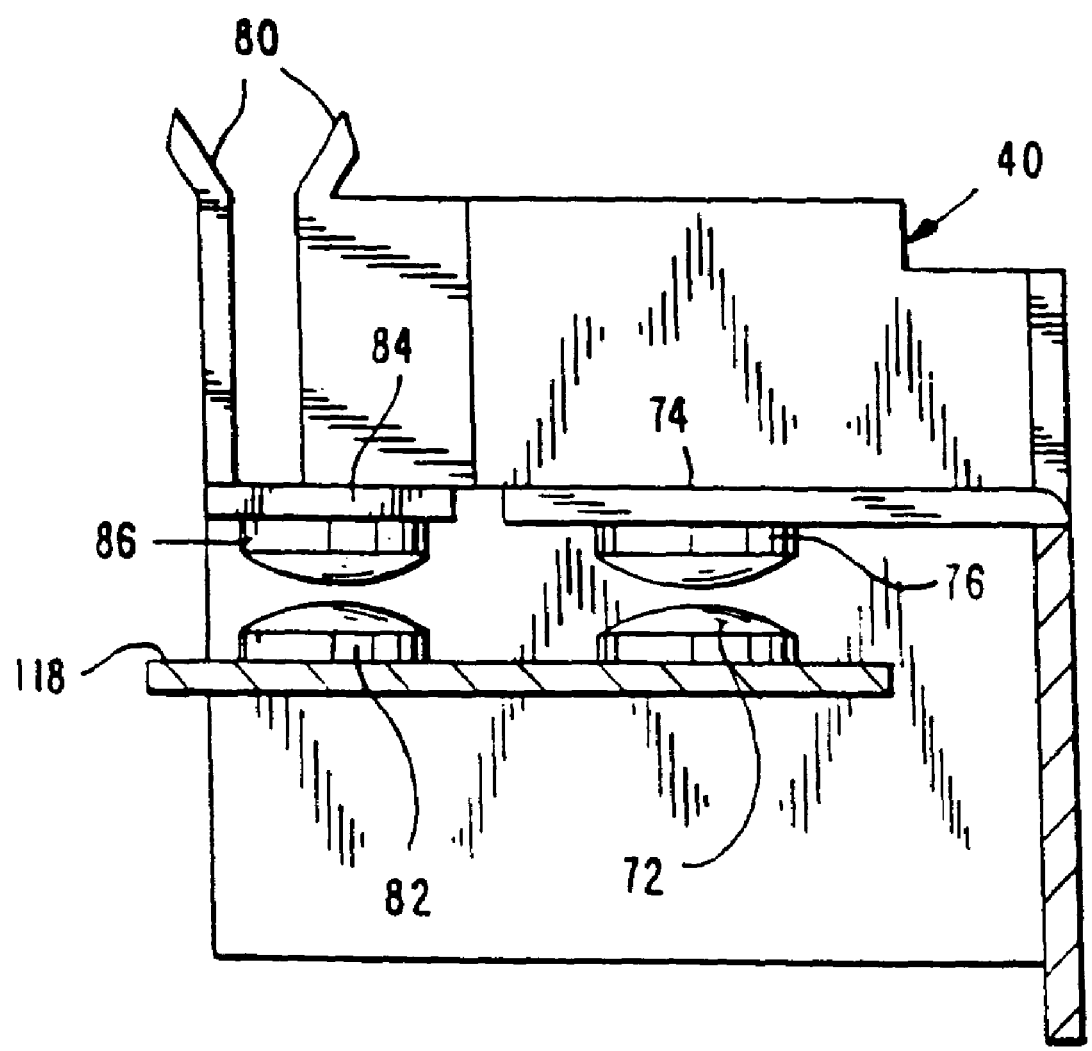
FIG. 6 is a partial sectional view of a portion of a conductive path shown in FIG. 4.
Figure 17:
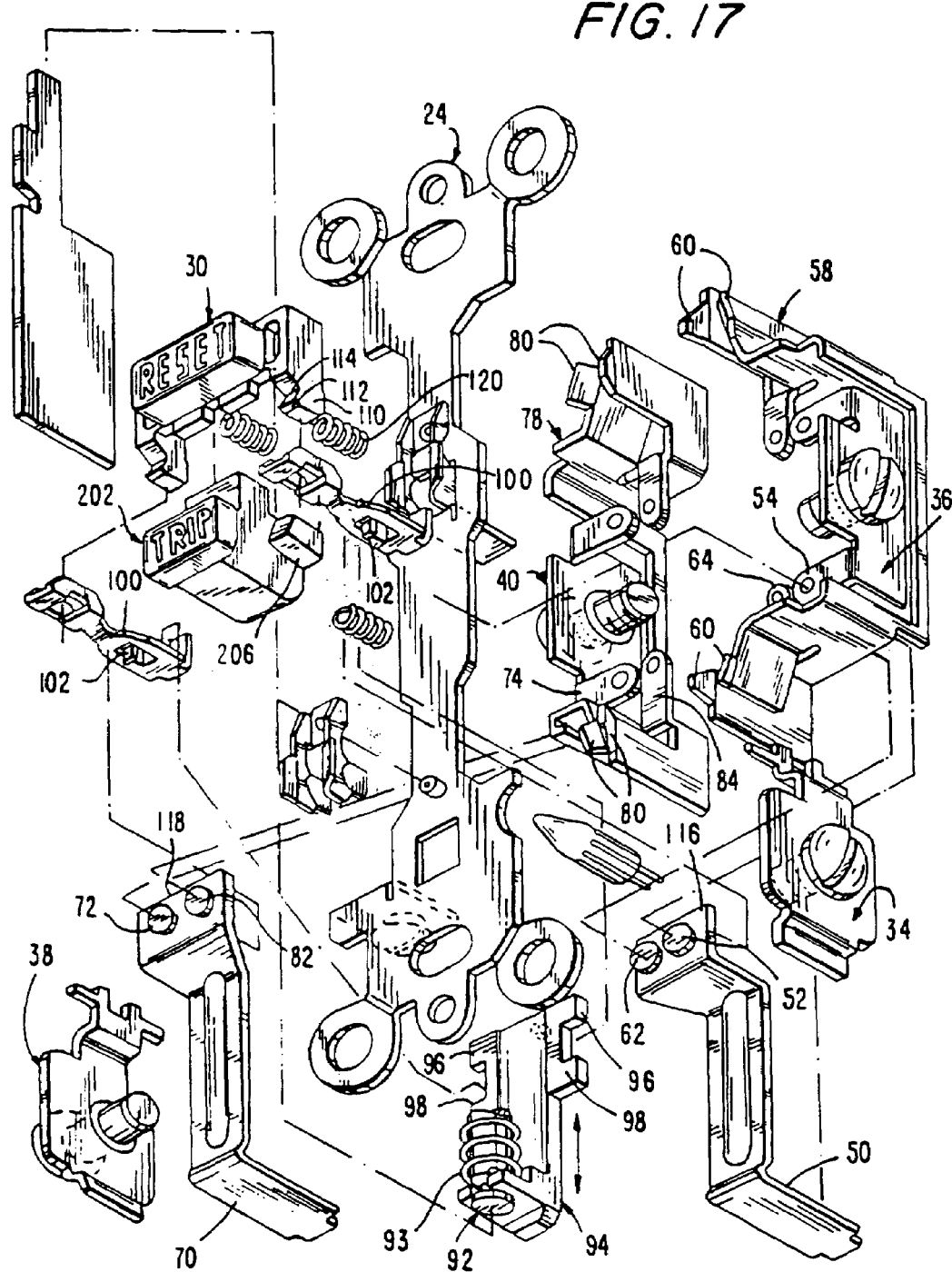
FIG. 17 is an exploded view of internal components of the GFCI device of FIG. 13.

Similarly, the conductive path between the line neutral connection 38 and the load neutral connection 40 includes, contact arm 70 which is movable between stressed and unstressed positions, movable contact 72 mounted to contact arm 70, contact arm 74 secured to or monolithically formed into load neutral connection 40, and fixed contact 76 mounted to the contact arm 74 (seen in FIGS. 4, 6 and 17). The user accessible load neutral connection for this embodiment includes terminal assembly 78 having two binding terminals 80 which are capable of engaging a prong of a male plug inserted therebetween. The conductive path between the line neutral connection 38 and the user accessible load neutral connection includes, contact arm 70, movable contact 82 mounted to the contact arm 70, contact arm 84 secured to or monolithically formed into terminal assembly 78, and fixed contact 86 mounted to contact arm 84. These conductive paths are collectively called the neutral conductive path.

Figure 14:
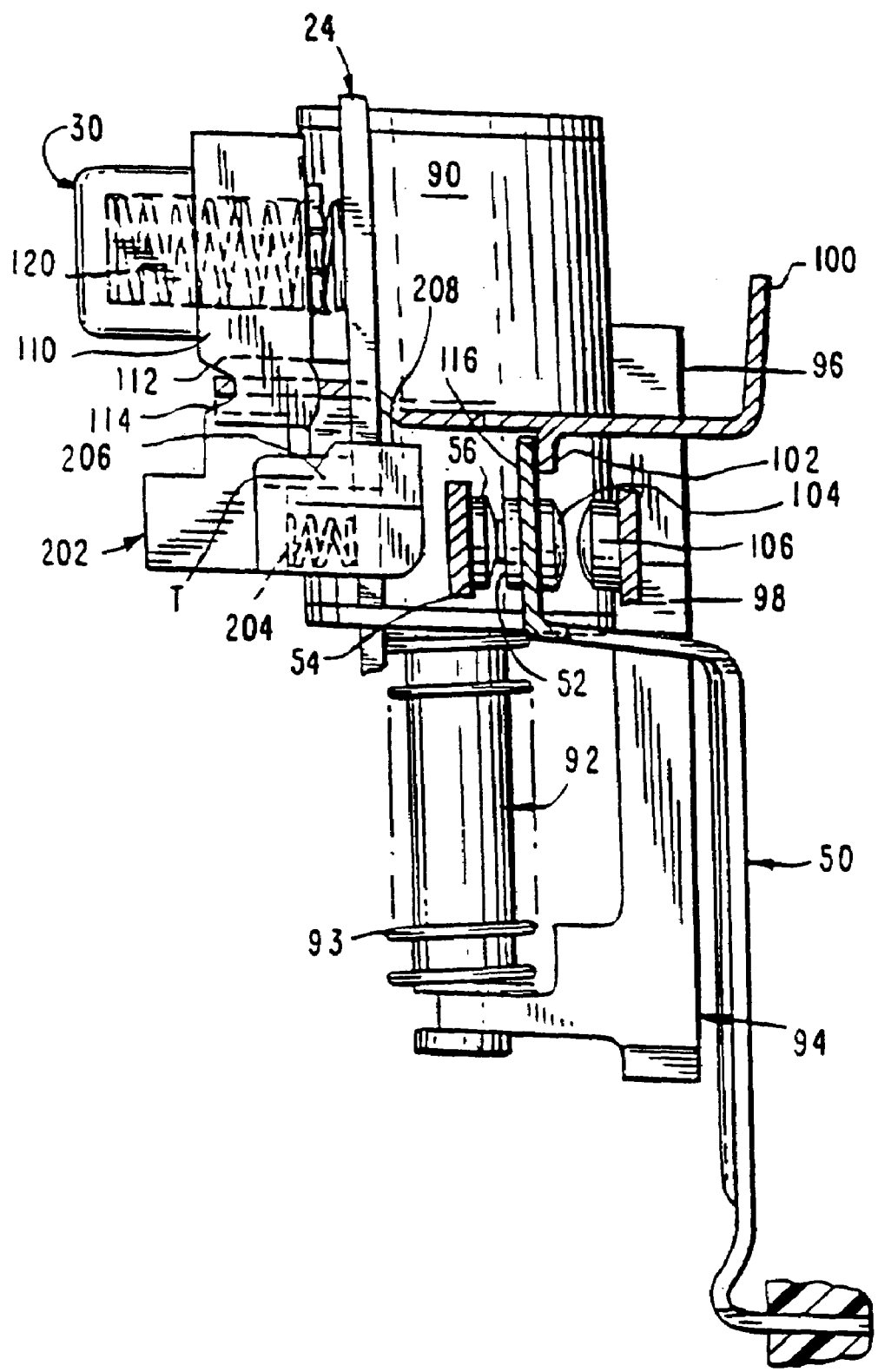
FIG. 14 is side elevational view, partly in section, of a portion of the GFCI device shown in FIG. 13, illustrating the GFCI device in a set or circuit making position.

There is also shown in FIG. 14, mechanical components used during circuit interrupting and reset operations according to this embodiment of the present application. Although these components shown in the drawings are electromechanical in nature, the present application also contemplates using semiconductor type circuit interrupting and reset components, as well as other mechanisms capable of making and breaking electrical continuity.

The circuit interrupting device according to this embodiment incorporates an independent trip portion into the circuit interrupting device of FIGS. 1–12. Therefore, a description of the circuit interrupting, reset and reset lockout portions are omitted.

Figure 15:
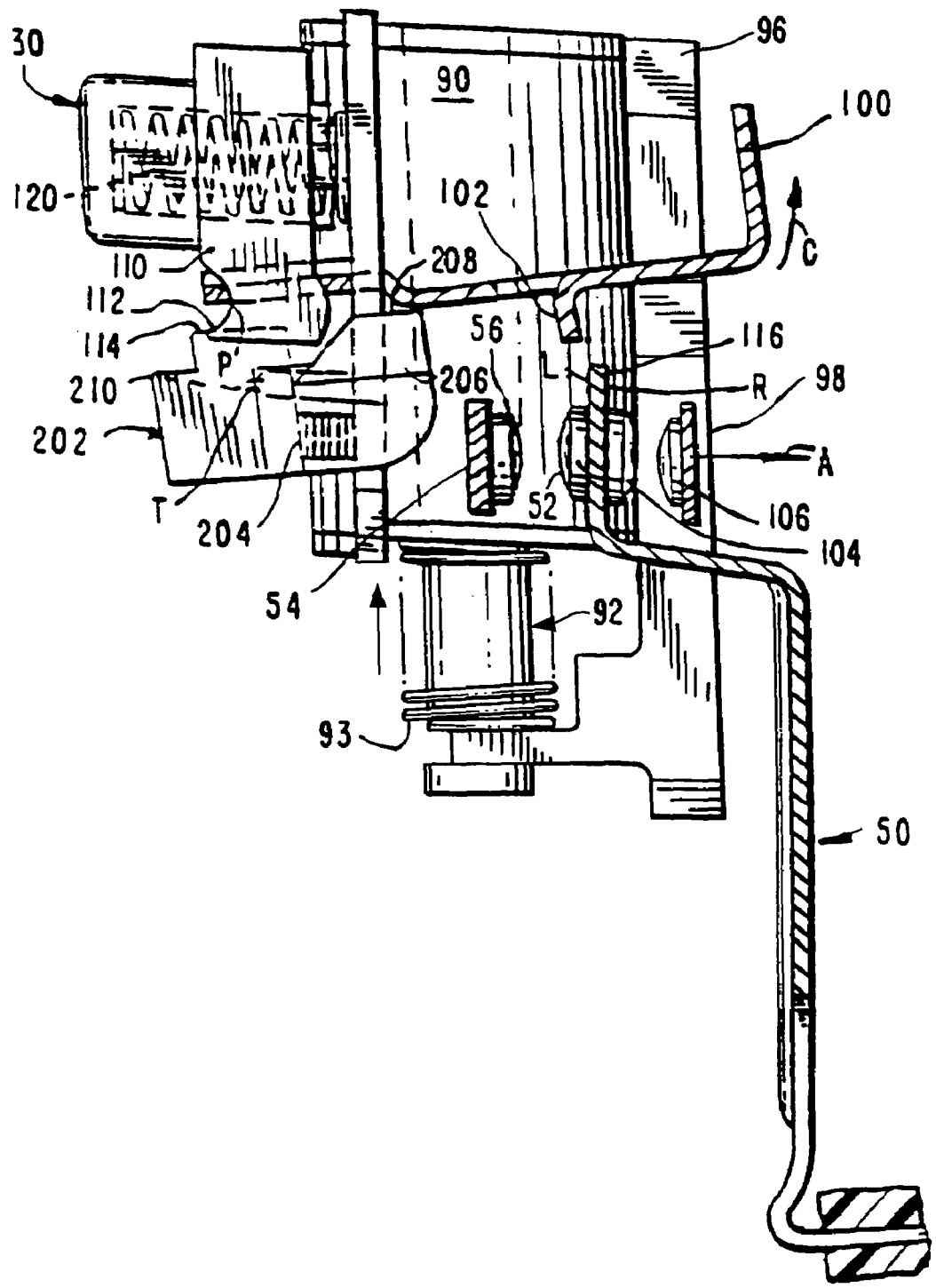
FIG. 15 is a side elevational view similar to FIG. 14, illustrating the GFCI device in a circuit breaking position.
Figure 16:
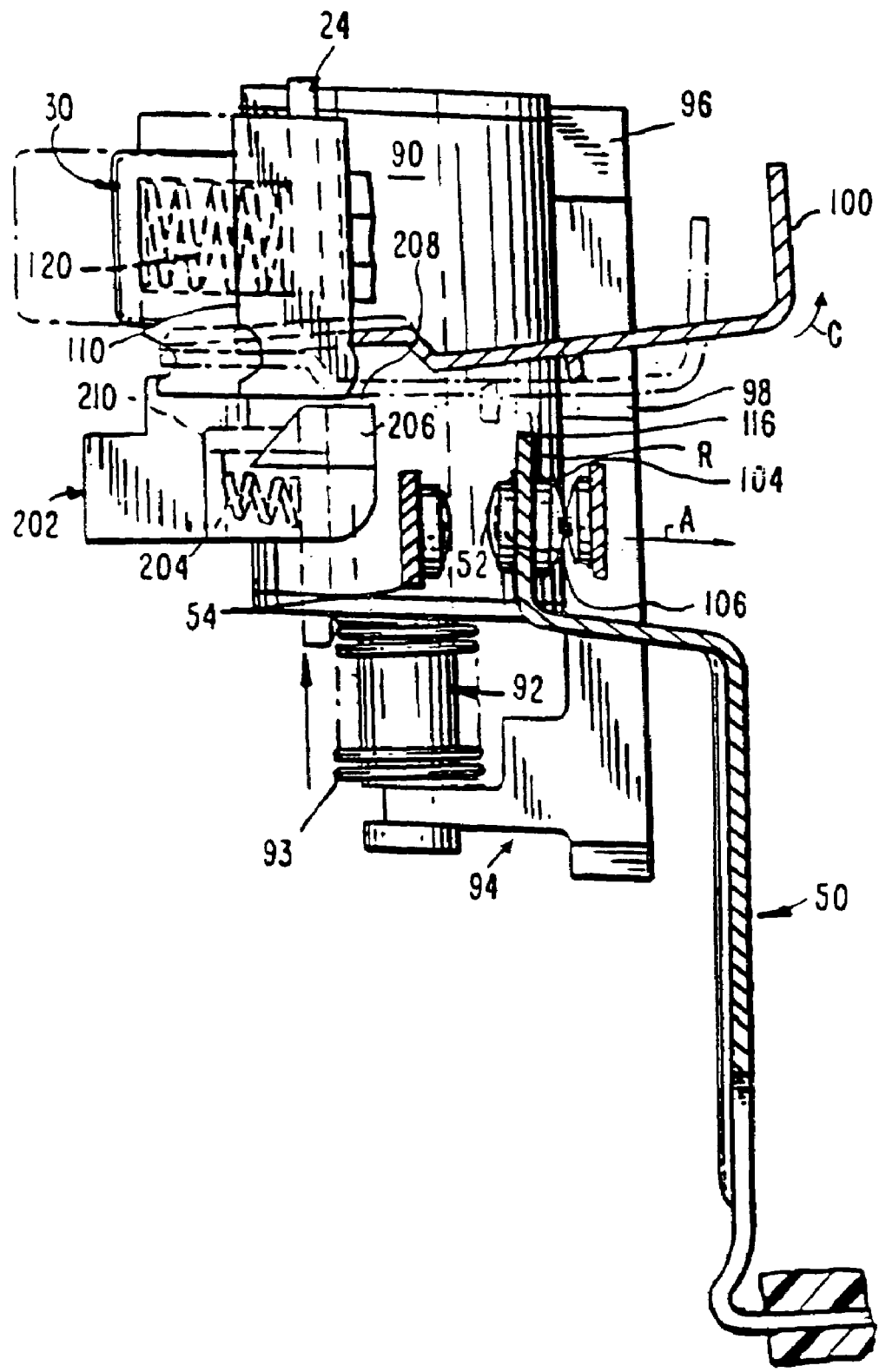
FIG. 16 is a side elevational view similar to FIG. 14, illustrating the components of the GFCI device during a reset operation.

Referring to FIGS. 14–16 an exemplary embodiment of the trip portion according to the present application includes a trip actuator 202, preferably a button, that is movable between a set position, where contacts 52 and 56 are permitted to close or make contact, as seen in FIG. 14, and a trip position where contacts 52 and 56 are caused to open, as seen in FIG. 15. Spring 204 normally biases trip actuator 202 toward the set position. The trip portion also includes a trip arm 206 that extends from the trip actuator 202 so that a surface 208 of the trip arm 206 moves into contact with the movable latching member 100, when the trip button is moved toward the trip position. When the trip actuator 202 is in the set position, surface 208 of trip arm 202 can be in contact with or close proximity to the movable latching member 100, as seen in FIG. 14.

Figure 18:
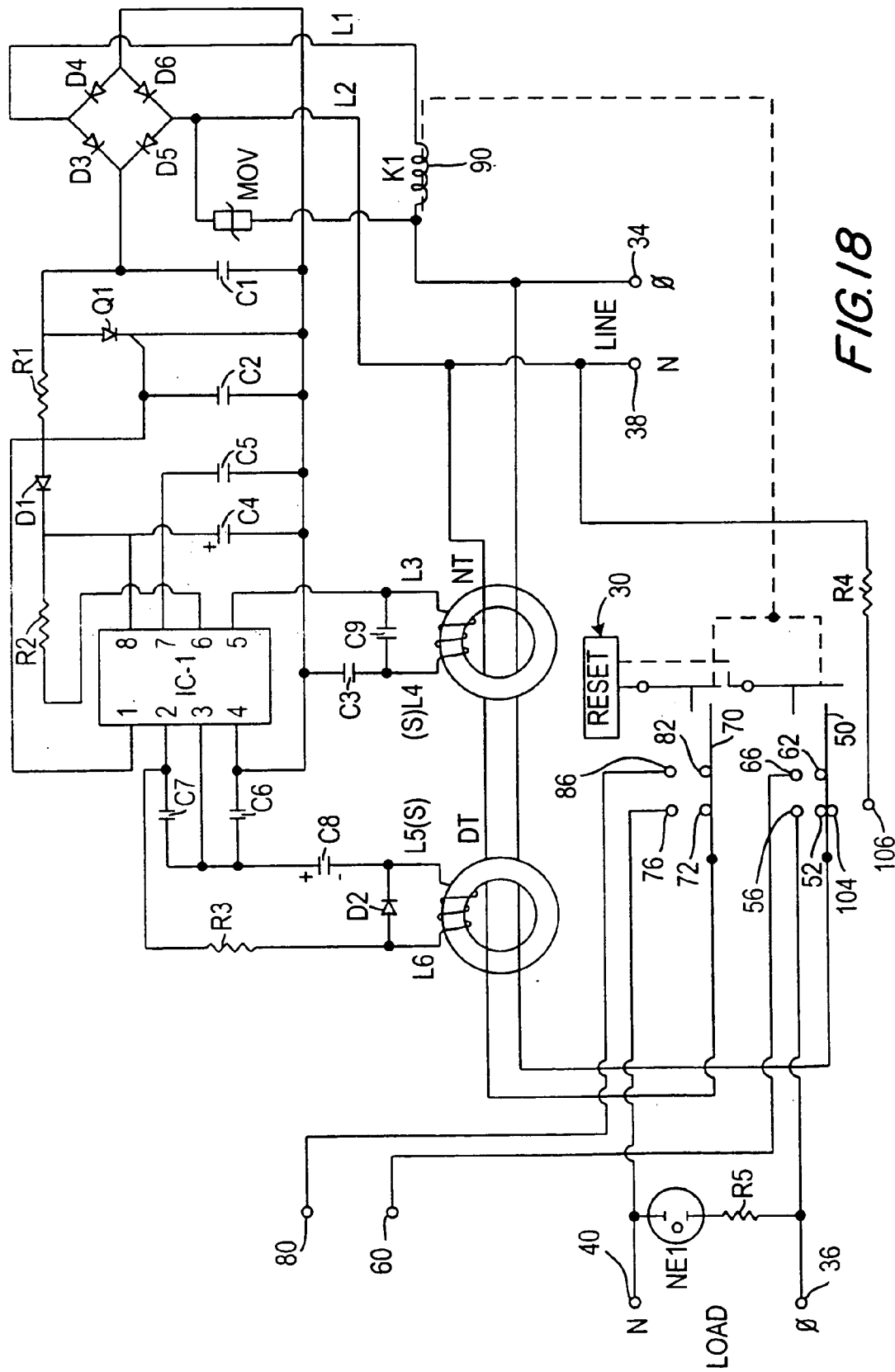
FIG. 18 is a schematic diagram of a circuit for detecting ground faults and resetting the GFCI device of FIG. 13.

In operation, upon depression of the trip actuator 202, the trip actuator pivots about point T of pivot arm 210 (seen in FIG. 15) extending from strap 24 so that the surface 208 of the trip arm 206 can contact the movable latching member 100. As the trip actuator 202 is moved toward the trip position, trip arm 206 also enters the path of movement of the finger 110 associated with reset button 30 thus blocking the finger 102 from further movement in the direction of arrow A (seen in FIG. 15). By blocking the movement of the finger 110, the trip arm 206 inhibits the activation of the reset operation and, thus, inhibits simultaneous activation of the trip and reset operations. Further depression of the trip actuator 202 causes the movable latching member 100 to pivot about point T in the direction of arrow C (seen in FIG. 15). Pivotal movement of the latching member 100 causes latching finger 102 of latching arm 100 to move out of contact with the movable contact arm 50 so that the arm 50 returns to its unstressed condition, and the conductive path is broken. Resetting of the device is achieved as described above. An exemplary embodiment of the circuitry used to sense faults and reset the conductive paths, is shown in FIG. 18.

As noted above, if opening and closing of electrical continuity in the neutral conductive path is desired, the above description for the phase conductive path is also applicable to the neutral conductive path.

Figure 19:
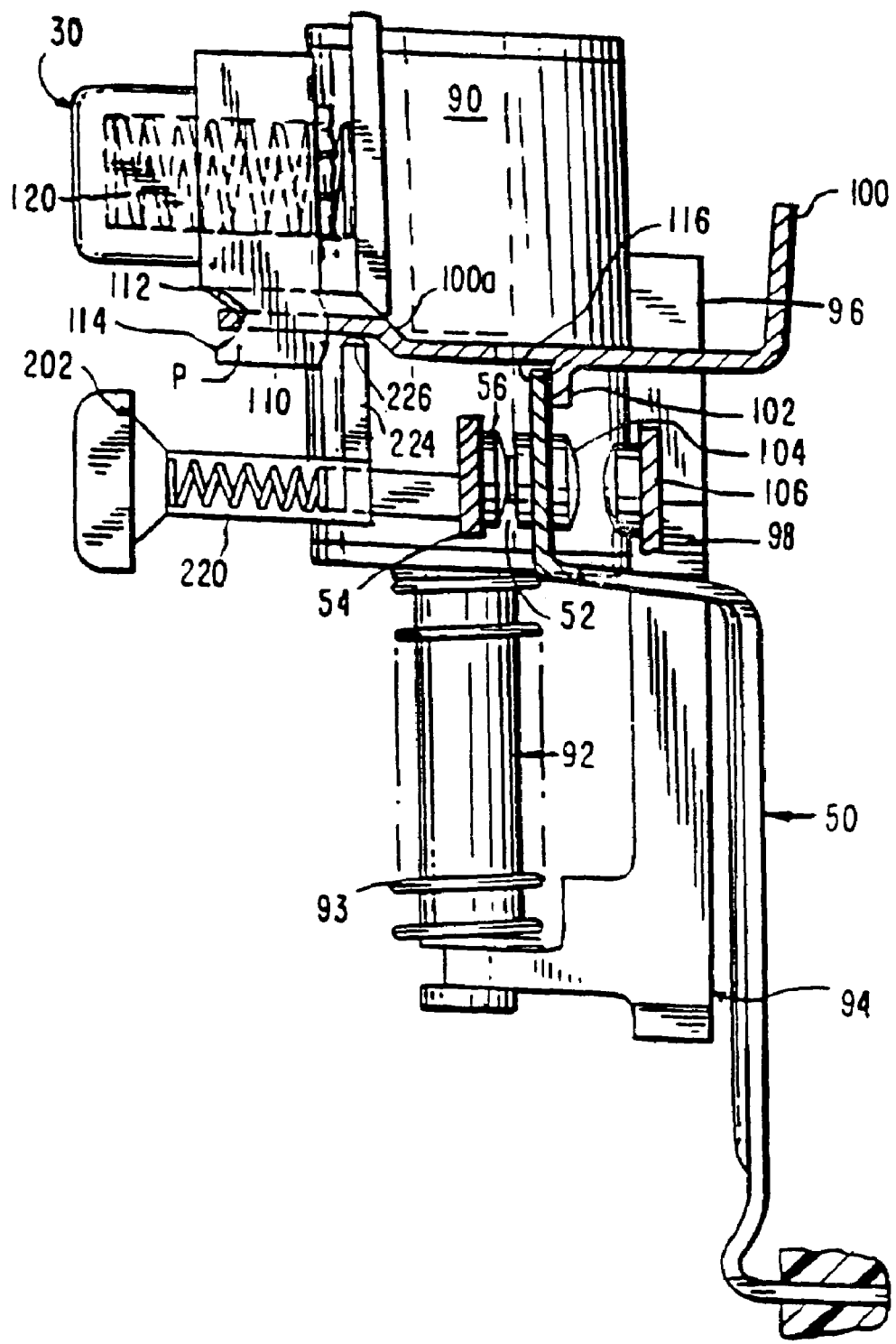
FIG. 19 is side elevational view, partly in section, of components of a portion of the alternative embodiment of the GFCI device shown in FIG. 13, illustrating the device in a set or circuit making position.
Figure 20:
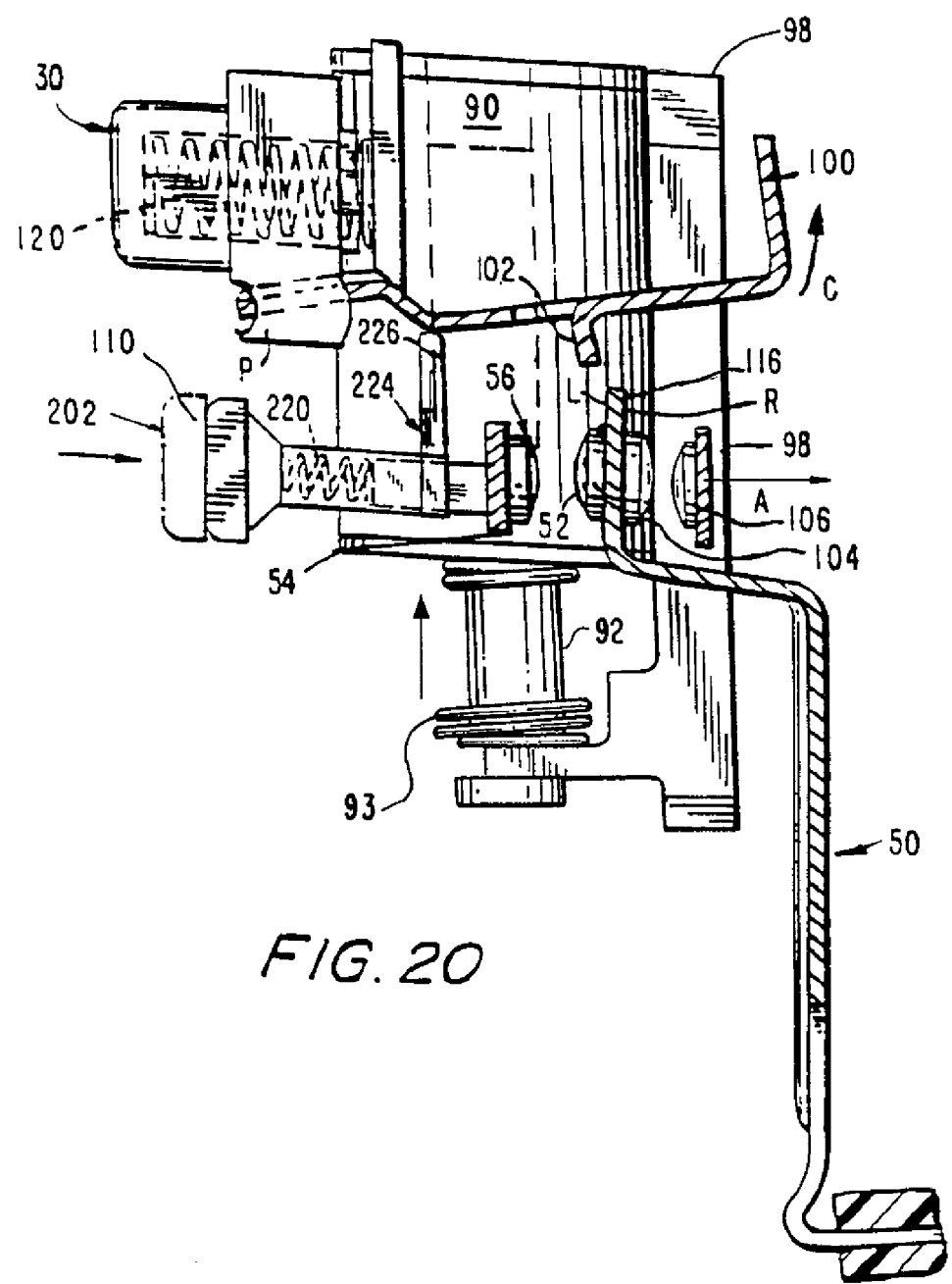
FIG. 20 is a side elevational view similar to FIG. 19, illustrating of the device in a circuit breaking position.

An alternative embodiment of the trip portion will be described with reference to FIGS. 19 and 20. In this embodiment, the trip portion includes a trip actuator 202 that at is movable between a set position, where contacts 52 and 56 are permitted to close or make contact, as seen in FIG. 19, and a trip position where contacts 52 and 56 are caused to open, as seen in FIG. 20. Spring 220 normally biases trip actuator 202 toward the set position. The trip portion also includes a trip arm 224 that extends from the trip actuator 202 so that a distal end 226 of the trip arm is in movable contact with the movable latching member 100. As noted above, the movable latching member 100 is, in this embodiment, common to the trip, circuit interrupting, reset and reset lockout portions and is used to make, break or lockout the electrical connections in the phase and/or neutral conductive paths.

In this embodiment, the movable latching member 100 includes a ramped portion 100a which facilitates opening and closing of electrical contacts 52 and 56 when the trip actuator 202 is moved between the set and trip positions, respectively. To illustrate, when the trip actuator 202 is in the set position, distal end 226 of trip arm 224 contacts the upper side of the ramped portion 100a, seen in FIG. 19. When the trip actuator 202 is depressed, the distal end 226 of the trip arm 224 moves along the ramp and pivots the latching member 60 about point P in the direction of arrow C causing latching finger 102 of the latching member 100 to move out of contact with the movable contact arm 50 so that the arm 50 returns to its unstressed condition, and the conductive path is broken. Resetting of the device is achieved as described above.

Figure 21:
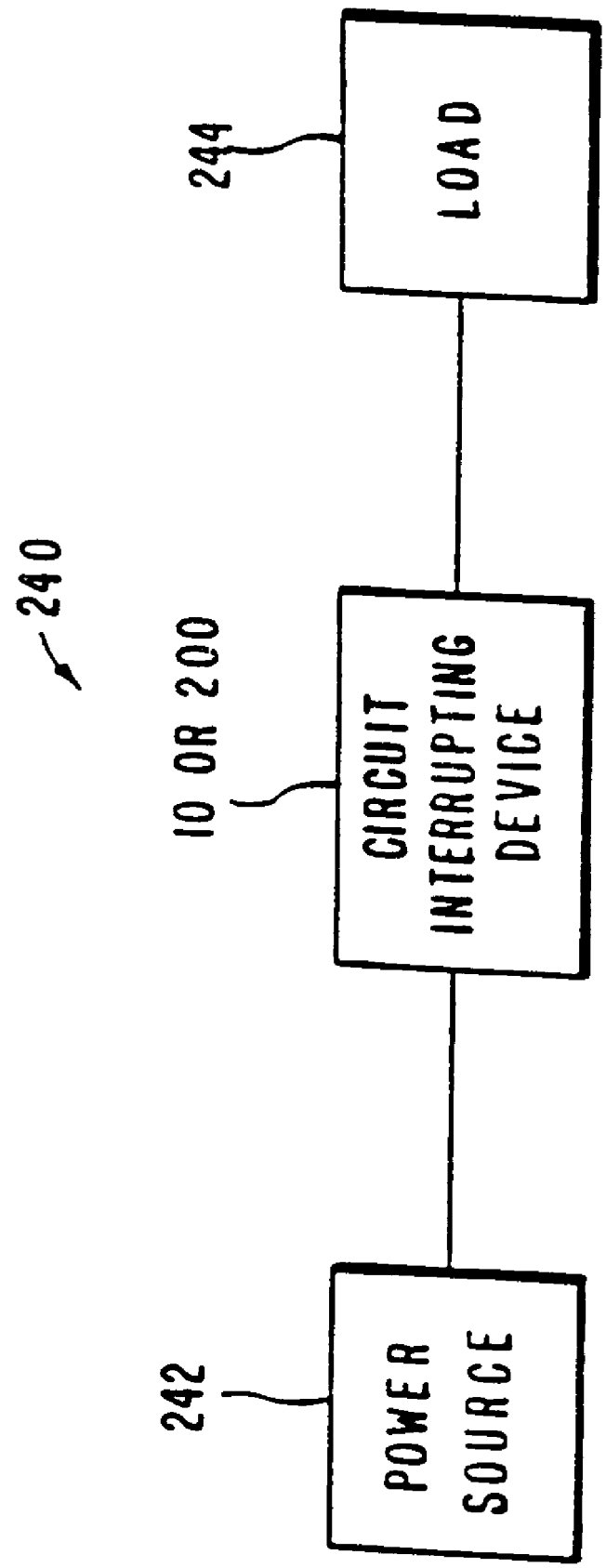
FIG. 21 is a block diagram of a circuit interrupting system according to the present application.

The circuit interrupting device according to the present application can be used in electrical systems, shown in the exemplary block diagram of FIG. 21. The system 240 includes a source of power 242, such as ac power in a home, at least one circuit interrupting device, e.g., circuit interrupting device 10 or 200, electrically connected to the power source, and one or more loads 244 connected to the circuit interrupting device. As an example of one such system, ac power supplied to single gang junction box in a home may be connected to a GFCI device having one of the above described reverse wiring fault protection, independent trip or reset lockout features, or any combination of these features may be combined into the circuit interrupting device. Household appliances that are then plugged into the device become the load or loads of the system.

As noted, although the components used during circuit interrupting and device reset operations are electromechanical in nature, the present application also contemplates using electrical components, such as solid state switches and supporting circuitry, as well as other types of components capable or making and breaking electrical continuity in the conductive path.

While there have been shown and described and pointed out the fundamental features of the invention, it will be understood that various omissions and substitutions and changes of the form and details of the device described and illustrated and in its operation may be made by those skilled in the art, without departing from the spirit of the invention.

What is claimed is:

1. A circuit interrupting device comprising:
   a first pair of terminals adapted for connection to line and neutral terminals of a power source or a load circuit; a second pair of terminals adapted for connection to line and neutral terminals of a power source when said first pair of terminals is connected to a load circuit or for connection to a load circuit when said first pair of terminals is connected to line and neutral terminals of a power source, or adapted to be left unconnected when the first pair of terminals are connected to line and neutral terminals of a power source; and a third pair of terminals adapted for connection to a load provided by a user, and
   detection circuitry coupled to the first, second and third pair of terminals.

2. The device of claim 1 wherein the detection circuitry comprised at least first and second differential transformers each coupled to detect leakage current in the load circuit.

3. The device of claim 2 wherein the first differential transformer is coupled to detect leakage current in a load circuit coupled to the first pair of terminals and the third pair of terminals.

4. The device of claim 2 wherein the second differential transformer is coupled to detect a leakage current in a load circuit coupled to the second pair of terminals and the third pair of terminals.

5. The device of claim 2 wherein the first differential transformer is coupled to detect leakage current when a load circuit is coupled to the first and/or third pair of terminals and the second differential transformer is coupled to detect leakage current when a load circuit is coupled to the second and/or third pair of terminals.

6. The device of claim 5 wherein the first and second differential transformers are coupled through a four pole double throw latch to at least one rectifier.

7. The device of claim 6 wherein the first differential transformer is coupled through first and second poles of the four pole double throw latch to a first rectifier and the second differential transformer is coupled through third and fourth poles of the four pole double throw latch to a second rectifier.

8. The device of claim 7 wherein the first rectifier is a one-half wave or a full wave rectifier.

9. The device of claim 8 wherein the second rectifier is a one-half wave or a full wave rectifier.

10. The device of claim 9 wherein the four pole double throw latch has at least four wiper arms each of which makes contact with a first of two contacts when in a first position and the second of the two contacts when in a second position.

11. The device of claim 10 further comprising:
    a reset button, when depressed, is coupled to move the at least four wiper arms to their second position to contact their second contacts.

12. The device of claim 11 further comprising a spring coupled to urge the reset button to its up position.

13. The device of claim 11 further comprising a solenoid activated by one of the rectifiers when either the first or second differential transformer detects leakage current to open the connection between the wiper arms and their contacts to break the electrical connection between the line and the load circuit.

14. The device of claim 11 further comprising a second spring coupled to the reset button to urge the four pole double throw latch to couple the load circuit to the line when the reset button is pressed.

* * * * *